US010880900B2

(12) United States Patent
Gulati et al.

(10) Patent No.: US 10,880,900 B2
(45) Date of Patent: Dec. 29, 2020

(54) NOISE TRACKING WITHIN TRANSMISSION TIME INTERVALS IN WIRELESS COMMUNICATIONS

(71) Applicant: QUALCOMM Incorporated, San Diego, CA (US)

(72) Inventors: Kapil Gulati, Hillsborough, NJ (US); Naga Bhushan, San Diego, CA (US); Sudhir Kumar Baghel, Hillsborough, NJ (US); Shailesh Patil, San Diego, CA (US); Arjun Bharadwaj, Poway, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/575,293

(22) Filed: Sep. 18, 2019

(65) Prior Publication Data

US 2020/0106588 A1    Apr. 2, 2020

Related U.S. Application Data

(60) Provisional application No. 62/738,146, filed on Sep. 28, 2018.

(51) Int. Cl.
*H04W 72/08* (2009.01)
*H04L 5/00* (2006.01)
(Continued)

(52) U.S. Cl.
CPC ....... *H04W 72/082* (2013.01); *H04J 11/0026* (2013.01); *H04J 11/0036* (2013.01);
(Continued)

(58) Field of Classification Search
CPC .......... H04W 72/082; H04W 72/0446; H04W 72/1231; H04W 72/0453; H04W 74/0808;
(Continued)

(56) References Cited

U.S. PATENT DOCUMENTS

| 2009/0316591 A1* | 12/2009 | Reial | H04L 1/0023 370/252 |
| 2018/0376495 A1* | 12/2018 | Lee | H04W 72/1289 |
| 2019/0320453 A1* | 10/2019 | Hosseini | H04L 5/0023 |

OTHER PUBLICATIONS

International Search Report and Written Opinion—PCT/US2019/051845—ISA/EPO—dated Jan. 8, 2020
(Continued)

*Primary Examiner* — Joshua Kading
(74) *Attorney, Agent, or Firm* — Holland & Hart LLP

(57) ABSTRACT

Methods, systems, and devices for wireless communications are described that support noise tracking within transmission time intervals (TTIs) in wireless communications. A transmitting user equipment (UE) in direct communications with a receiving UE may transmit one or more reference signals that allow the receiving UE to estimate noise during different portions of a TTI and compensate for varying noise levels within the TTI. The transmitting UE may identify different sets of symbols within the TTI that are expected to have different noise levels, and may transmit one or more reference signals that allow for noise estimation at the receiving UE for each of the different sets of symbols.

30 Claims, 16 Drawing Sheets

(51) Int. Cl.
- *H04W 72/04* (2009.01)
- *H04W 72/12* (2009.01)
- *H04J 11/00* (2006.01)
- *H04L 1/00* (2006.01)
- *H04L 25/03* (2006.01)
- *H04L 5/26* (2006.01)
- *H04W 28/02* (2009.01)
- *H04W 74/08* (2009.01)
- *H04L 27/26* (2006.01)
- *H04B 7/0413* (2017.01)

(52) U.S. Cl.
CPC .......... *H04L 1/0006* (2013.01); *H04L 1/0033* (2013.01); *H04L 1/0039* (2013.01); *H04L 5/0051* (2013.01); *H04L 5/0062* (2013.01); *H04L 5/0082* (2013.01); *H04L 5/0094* (2013.01); *H04L 5/26* (2013.01); *H04L 25/03821* (2013.01); *H04W 28/0236* (2013.01); *H04W 72/0446* (2013.01); *H04W 72/1231* (2013.01); *H04W 74/0808* (2013.01); *H04B 7/0413* (2013.01); *H04L 5/0092* (2013.01); *H04L 27/2607* (2013.01)

(58) Field of Classification Search
CPC ............. H04W 28/0236; H04L 1/0006; H04L 1/0033; H04L 1/0039; H04L 1/0003; H04L 25/03821; H04L 25/03006; H04L 5/26; H04L 5/0082; H04L 5/0094; H04L 5/0062; H04L 5/0048–0051; H04L 5/0092; H04L 5/0007; H04L 5/0036; H04L 27/2607; H04J 11/0026; H04J 11/0036; H04J 11/003; H04B 7/0413

See application file for complete search history.

(56) References Cited

OTHER PUBLICATIONS

LG Electronics: "Discussion on Sidelink Physical Layer Structures and Procedures", 3GPP Draft; R1-1808520 Discussion on Sidelink Physical Layer Structures and Procedures, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018 Aug. 11, 2018, XP051515898, Retrieved from the Internet: URL:http://www.3gpp.org/ftp/tsg%5Fran/WG1%5FRL1/TSGR1%5F94/Docs/R1%2D1808520%2Ezip [retrieved on Aug. 11, 2018], section 2.1.5, 9 pages.

VIVO: "Physical Layer Structure and Procedure for NR Sidelink", 3GPP Draft; R1-1808243 Physical Layer Structure and Procedure for NR Sidelink, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018 Aug. 10, 2018, XP051515628, Retrieved from the Internet:URL:http://www.3gpp.org/ftp/tsg%5Fran/WG1%5FRL1/TSGR1%5F94/Docs/R1%2D1808243%2Ezip [retrieved on Aug. 10, 2018], section 3.2, 5 pages.

ZTE: "Discussion on Downlink DMRS Design", 3GPP Draft; R1-1707130 Discussion on Downlink DMRS Design, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017 May 14, 2017, XP051272356, Retrieved from the Internet: URL:http://www.3gpp.org/ftp/Meetings_3GPP_SYNC/RAN1/Docs/ [retrieved on May 14, 2017], section 2.1, 11 pages.

* cited by examiner

NOISE TRACKING WITHIN TRANSMISSION TIME INTERVALS IN WIRELESS COMMUNICATIONS

CROSS REFERENCE

The present application for patent claims the benefit of U.S. Provisional Patent Application No. 62/738,146 by GULATI, et al., entitled "NOISE TRACKING WITHIN TRANSMISSION TIME INTERVALS IN WIRELESS COMMUNICATIONS," filed Sep. 28, 2018, assigned to the assignee hereof, and expressly incorporated herein.

BACKGROUND

The following relates generally to wireless communications, and more specifically to noise tracking within transmission time intervals in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as distributed wireless networks, wireless devices (e.g., UEs) may directly communicate with each other (e.g., via sidelink communications). In some cases, a base station in a distributed wireless network may allocate certain resources for sidelink communications, and UEs within the system may perform a contention-based access procedure before initiating a transmission within the allocated resources. In some cases, such contention-based access procedures may result in different transmitters that start and stop transmissions at different times. In cases where different transmitters are in proximity of each other, such techniques may result in noise at a receiver that varies within a transmission time interval (TTI) based on when different transmitters start and stop transmissions. Techniques to provide reliable reception of communications in such environments may thus be desirable to enhance network reliability and efficiency.

SUMMARY

The described techniques relate to improved methods, systems, devices, and apparatuses that support noise tracking within transmission time intervals (TTIs) in wireless communications. In various aspects, the described techniques provide for transmission of reference signals that can allow a receiving device to estimate noise during different portions of a transmission time interval (TTI) and compensate for varying noise levels within the TTI.

In some cases, a transmitting device (e.g., a transmitting UE in a distributed network) may identify different sets of symbols within a TTI that are expected to have different signal to interference and noise ratio (SINR) levels at a receiving device. The transmitting device may determine that one or more first reference signals are to be transmitted in a first set of symbols within the TTI that may allow for noise estimation at the receiving device for the first set of symbols. The transmitting device may also determine that one or more second reference signals are to be added to a second set of symbols in order to allow for noise estimation at the receiving device for the second set of symbols.

A receiving device may receive the transmission during the TTI from the transmitting device, and may determine that the one or more first reference signals are transmitted in the first set of symbols and that the one or more second reference signals are transmitted in the second set of symbols. The receiving device may use the one or more first reference signals to estimate a first noise level of the first set of symbols, and use the one or more second reference signals to estimate a second noise level of the second set of symbols. The first noise level and the second noise level may then be used to aid in demodulating the transmission.

A method of wireless communication is described. The method may include identifying a first set of symbols within a TTI that have a first expected noise level and a second set of symbols within the TTI that have a second expected noise level, where the second set of symbols is different than the first set of symbols within the TTI and the first expected noise level is different than the second expected noise level, identifying one or more first reference signals configured for the TTI, the one or more first reference signals in at least one symbol of the first set of symbols, determining one or more symbols in the second set of symbols that are to include one or more second reference signals based on the first expected noise level being different than the second expected noise level, and transmitting the one or more first reference signals in the first set of symbols and the one or more second reference signals in the second set of symbols.

An apparatus for wireless communication is described. The apparatus may include a processor, memory in electronic communication with the processor, and instructions stored in the memory. The instructions may be executable by the processor to cause the apparatus to identify a first set of symbols within a TTI that have a first expected noise level and a second set of symbols within the TTI that have a second expected noise level, where the second set of symbols is different than the first set of symbols within the TTI and the first expected noise level is different than the second expected noise level, identify one or more first reference signals configured for the TTI, the one or more first reference signals in at least one symbol of the first set of symbols, determine one or more symbols in the second set of symbols that are to include one or more second reference signals based on the first expected noise level being different than the second expected noise level, and transmit the one or more first reference signals in the first set of symbols and the one or more second reference signals in the second set of symbols.

Another apparatus for wireless communication is described. The apparatus may include means for identifying a first set of symbols within a TTI that have a first expected noise level and a second set of symbols within the TTI that have a second expected noise level, where the second set of symbols is different than the first set of symbols within the TTI and the first expected noise level is different than the second expected noise level, identifying one or more first reference signals configured for the TTI, the one or more first reference signals in at least one symbol of the first set of symbols, determining one or more symbols in the second set of symbols that are to include one or more second reference signals based on the first expected noise level being different than the second expected noise level, and transmitting the one or more first reference signals in the first set of symbols and the one or more second reference signals in the second set of symbols.

A non-transitory computer-readable medium storing code for wireless communication is described. The code may include instructions executable by a processor to identify a first set of symbols within a TTI that have a first expected noise level and a second set of symbols within the TTI that have a second expected noise level, where the second set of symbols is different than the first set of symbols within the TTI and the first expected noise level is different than the second expected noise level, identify one or more first reference signals configured for the TTI, the one or more first reference signals in at least one symbol of the first set of symbols, determine one or more symbols in the second set of symbols that are to include one or more second reference signals based on the first expected noise level being different than the second expected noise level, and transmit the one or more first reference signals in the first set of symbols and the one or more second reference signals in the second set of symbols.

In some examples of the method, apparatuses, and non-transitory computer-readable medium described herein, the one or more second reference signals may be added to the second set of symbols based on the one or more first reference signals being absent from the second set of symbols and the first expected noise level being different than the second expected noise level. In some examples of the method, apparatuses, and non-transitory computer-readable medium described herein, the one or more second reference signals may be added to the second set of symbols based on a spacing between transmissions of the one or more first reference signals.

In some examples of the method, apparatuses, and non-transitory computer-readable medium described herein, the one or more first reference signals may be demodulation reference signals (DMRSs) transmitted in the first set of symbols and the one or more second reference signals may be additional instances of the DMRS that may be added and transmitted in the second set of symbols. In some examples of the method, apparatuses, and non-transitory computer-readable medium described herein, the one or more first reference signals may be DMRSs transmitted in the first set of symbols and the one or more second reference signals may be noise tracking reference signals (NTRSs) transmitted in the second set of symbols. In some examples of the method, apparatuses, and non-transitory computer-readable medium described herein, the DMRSs may be transmitted for a first number of antenna ports, and the NTRSs may be transmitted for a second number of antenna ports that may be less than the first number of antenna ports.

In some examples of the method, apparatuses, and non-transitory computer-readable medium described herein, a first frequency density of the one or more first reference signals within the first set of symbols may be greater than a second frequency density of the one or more second reference signals within the second set of symbols. Some examples of the method, apparatuses, and non-transitory computer-readable medium described herein may further include operations, features, means, or instructions for receiving configuration information that indicates the first set of symbols and the second set of symbols, and that indicates the first set of symbols may have a different expected noise level than the second set of symbols. In some examples of the method, apparatuses, and non-transitory computer-readable medium described herein, the configuration information may be received in RRC signaling. In some examples of the method, apparatuses, and non-transitory computer-readable medium described herein, the identifying may be based on a preconfigured or semi-statically configured resource pool that includes the TTI. In some examples of the method, apparatuses, and non-transitory computer-readable medium described herein, the TTI includes contention-based resources, and where the identifying may be based on a number of symbols within the TTI associated with a contention-based access procedure for initiating transmissions within the TTI.

In some examples of the method, apparatuses, and non-transitory computer-readable medium described herein, the determining may include operations, features, means, or instructions for determining a set of configured symbol locations for transmission of the first reference signal and determining that the one or more second reference signals may be to be added for transmission in the second set of symbols based on the set of configured symbol locations being non-overlapping with the second set of symbols.

Some examples of the method, apparatuses, and non-transitory computer-readable medium described herein may further include operations, features, means, or instructions for determining to add the one or more second reference signals to the first set of symbols based on a time-density of the one or more first reference signals within the first set of symbols and transmitting the one or more second reference signals in the first set of symbols. In some examples of the method, apparatuses, and non-transitory computer-readable medium described herein, the determining to add the one or more second reference signals to the first set of symbols may be based on a first instance of the first reference signal occurring after a threshold number of symbols within the first set of symbols, and where at least one of the second reference signals may be located before the first instance of the first reference signal. In some examples of the method, apparatuses, and non-transitory computer-readable medium described herein, the one or more second reference signals may have a same frequency density as the one or more first reference signals. In some examples of the method, apparatuses, and non-transitory computer-readable medium described herein, a frequency density of the one or more second reference signals may be determined based on a data allocation size of the TTI, a modulation and coding scheme for the TTI, or any combination thereof.

In some examples of the method, apparatuses, and non-transitory computer-readable medium described herein, the one or more second reference signals may be transmitted via a reduced number of antenna ports relative to the first reference signal. In some examples of the method, apparatuses, and non-transitory computer-readable medium described herein, the one or more second reference signals may be transmitted using a single antenna port associated with a lowest indexed antenna port of the one or more first reference signals. In some examples of the method, apparatuses, and non-transitory computer-readable medium described herein, the one or more second reference signals may be transmitted using a single antenna port that may be quasi-co-located with a set of antenna ports associated with the one or more first reference signals. In some examples of the method, apparatuses, and non-transitory computer-readable medium described herein, the one or more second reference signals may be transmitted using one or more antenna ports, and where each antenna port of the one or more second reference signals may be quasi-co-located with one or more antenna ports associated with the one or more first reference signals based on a preconfigured or semi-statically configured mapping between antenna ports of the one or more first reference signals and the one or more second reference signals.

Some examples of the method, apparatuses, and non-transitory computer-readable medium described herein may further include operations, features, means, or instructions for transmitting an indication that the one or more second reference signals may be to be used for demodulating data transmissions in the second set of symbols. In some examples of the method, apparatuses, and non-transitory computer-readable medium described herein, the indication may be a flag that indicates transmission of one or more additional reference signals in addition to the one or more first reference signals. In some examples of the method, apparatuses, and non-transitory computer-readable medium described herein, the indication provides one or more of a symbol location, frequency density, or any combinations thereof, for one or more additional reference signals in addition to the one or more first reference signals. In some examples of the method, apparatuses, and non-transitory computer-readable medium described herein, the indication provides an index into a preconfigured mapping of reference signal symbol locations and frequency density. In some examples of the method, apparatuses, and non-transitory computer-readable medium described herein, the indication may be provided via a modulation and coding scheme (MCS) of the TTI, a maximum number of symbols configured for contention-based access to transmission resources of the TTI, a contention-based access sequence provided during an access procedure, a number of aggregated slots included in the TTI, an index into a preconfigured mapping of reference signal symbol locations and frequency density, a cyclic shift used for a reference signal transmitted with control information that carries the indication, or any combinations thereof.

A method of wireless communication is described. The method may include identifying one or more first reference signals configured for a TTI, the one or more first reference signals in at least one symbol of a first set of symbols within the TTI, determining one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols, receiving transmissions during the first set of symbols and the second set of symbols, and computing a first set of log likelihood ratios (LLRs) for the first set of symbols based on the first noise estimation, and computing a second set of LLRs for the second set of symbols based on the second noise estimation.

An apparatus for wireless communication is described. The apparatus may include a processor, memory in electronic communication with the processor, and instructions stored in the memory. The instructions may be executable by the processor to cause the apparatus to identify one or more first reference signals configured for a TTI, the one or more first reference signals in at least one symbol of a first set of symbols within the TTI, determine one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols, receive transmissions during the first set of symbols and the second set of symbols, and compute a first set of log likelihood ratios (LLRs) for the first set of symbols based on the first noise estimation, and compute a second set of LLRs for the second set of symbols based on the second noise estimation.

Another apparatus for wireless communication is described. The apparatus may include means for identifying one or more first reference signals configured for a TTI, the one or more first reference signals in at least one symbol of a first set of symbols within the TTI, determining one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols, receiving transmissions during the first set of symbols and the second set of symbols, and computing a first set of log likelihood ratios (LLRs) for the first set of symbols based on the first noise estimation, and computing a second set of LLRs for the second set of symbols based on the second noise estimation.

A non-transitory computer-readable medium storing code for wireless communication is described. The code may include instructions executable by a processor to identify one or more first reference signals configured for a TTI, the one or more first reference signals in at least one symbol of a first set of symbols within the TTI, determine one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols, receive transmissions during the first set of symbols and the second set of symbols, and compute a first set of log likelihood ratios (LLRs) for the first set of symbols based on the first noise estimation, and compute a second set of LLRs for the second set of symbols based on the second noise estimation.

In some examples of the method, apparatuses, and non-transitory computer-readable medium described herein, the one or more second reference signals may be added to the second set of symbols based on the one or more first reference signals being absent from the second set of symbols and a first expected noise level of the first set of symbols being different than a second expected noise level of the second set of symbols. In some examples of the method, apparatuses, and non-transitory computer-readable medium described herein, the one or more second reference signals may be added to the second set of symbols based on a spacing between transmissions of the one or more first reference signals.

In some examples of the method, apparatuses, and non-transitory computer-readable medium described herein, the determining may be based on one or more of control information received during the TTI, a resource pool configuration associated with the TTI, a transmission sequence received during the TTI, or any combinations thereof. In some examples of the method, apparatuses, and non-transitory computer-readable medium described herein, the control information includes an indication provided via a modulation and coding scheme (MCS) of the TTI, a maximum number of symbols configured for a contention-based access to transmission resources of the TTI, a number of aggregated slots included in the TTI, an index into a preconfigured mapping of reference signal symbol locations and frequency density, or combinations thereof. In some examples of the method, apparatuses, and non-transitory computer-readable medium described herein, the resource pool configuration associated with the TTI includes a number of symbols configured for a contention-based access procedure, a number of slots aggregated within the TTI, a location of a feedback symbol within the TTI, or any combinations thereof. In some examples of the method, apparatuses, and non-transitory computer-readable medium described herein, the transmission sequence received during the TTI may include a contention-based access sequence received during a symbol associated with a contention-based access procedure, a cyclic shift used for a reference signal transmitted with control information, or any combinations thereof.

Some examples of the method, apparatuses, and non-transitory computer-readable medium described herein may further include operations, features, means, or instructions for determining, based on the first reference signal and the second reference signal, one or more of a noise covariance estimation, a channel estimation, or a carrier frequency offset estimation for each of the first set of symbols and the second set of symbols for use in computing the first set of LLRs and the second set of LLRs.

In some examples of the method, apparatuses, and non-transitory computer-readable medium described herein, the one or more first reference signals may be DMRSs transmitted in the first set of symbols and the one or more second reference signals may be additional instances of the DMRS that may be added and transmitted in the second set of symbols. In some examples of the method, apparatuses, and non-transitory computer-readable medium described herein, the one or more first reference signals may be DMRSs transmitted in the first set of symbols and the one or more second reference signals may be NTRSs transmitted in the second set of symbols. In some examples of the method, apparatuses, and non-transitory computer-readable medium described herein, the DMRSs may be transmitted for a first number of antenna ports, and the NTRSs may be transmitted for a second number of antenna ports that may be less than the first number of antenna ports.

Some examples of the method, apparatuses, and non-transitory computer-readable medium described herein may further include operations, features, means, or instructions for receiving configuration information that indicates the first set of symbols and the second set of symbols, and that indicates the first set of symbols may have a different expected noise level than the second set of symbols, and where the determining may be based on the configuration information. In some examples of the method, apparatuses, and non-transitory computer-readable medium described herein, the configuration information may be received in RRC signaling.

In some examples of the method, apparatuses, and non-transitory computer-readable medium described herein, the determining may include operations, features, means, or instructions for determining that a set of configured symbol locations for transmission of the one or more first reference signals and determining that the one or more second reference signals may be to be added and transmitted in the second set of symbols based on the set of configured symbol locations being non-overlapping with the second set of symbols. In some examples of the method, apparatuses, and non-transitory computer-readable medium described herein, the one or more second reference signals may have a same frequency density as the one or more first reference signals. In some examples of the method, apparatuses, and non-transitory computer-readable medium described herein, the one or more second reference signals may have a reduced frequency density relative to the one or more first reference signals.

In some examples of the method, apparatuses, and non-transitory computer-readable medium described herein, the one or more second reference signals may be transmitted via a reduced number of antenna ports relative to the one or more first reference signals. In some examples of the method, apparatuses, and non-transitory computer-readable medium described herein, the one or more second reference signals may be transmitted using a single antenna port associated with a lowest indexed antenna port of the one or more first reference signals. In some examples of the method, apparatuses, and non-transitory computer-readable medium described herein, the one or more second reference signals may be transmitted using a single antenna port that may be quasi-co-located with a set of antenna ports associated with the one or more first reference signals. In some examples of the method, apparatuses, and non-transitory computer-readable medium described herein, the one or more second reference signals may be transmitted using one or more antenna ports, and where each antenna port of the one or more second reference signals may be quasi-co-located with one or more antenna ports associated with the one or more first reference signals based on a preconfigured or semi-statically configured mapping between antenna ports of the one or more first reference signals and the one or more second reference signals.

Some examples of the method, apparatuses, and non-transitory computer-readable medium described herein may further include operations, features, means, or instructions for receiving control information that includes an indication the one or more second reference signals may be transmitted in addition to the one or more first reference signals, and where the determining may be based on the indication. In some examples of the method, apparatuses, and non-transitory computer-readable medium described herein, the indication may be a flag that indicates one or more additional reference signals may be transmitted in addition to the one or more first reference signals. In some examples of the method, apparatuses, and non-transitory computer-readable medium described herein, the indication provides one or more of a symbol location, frequency density, or any combinations thereof, for one or more additional reference signals in addition to the one or more first reference signals. In some examples of the method, apparatuses, and non-transitory computer-readable medium described herein, the indication provides an index into a preconfigured mapping of reference signal symbol locations and frequency density.

DETAILED DESCRIPTION

Figure 1:
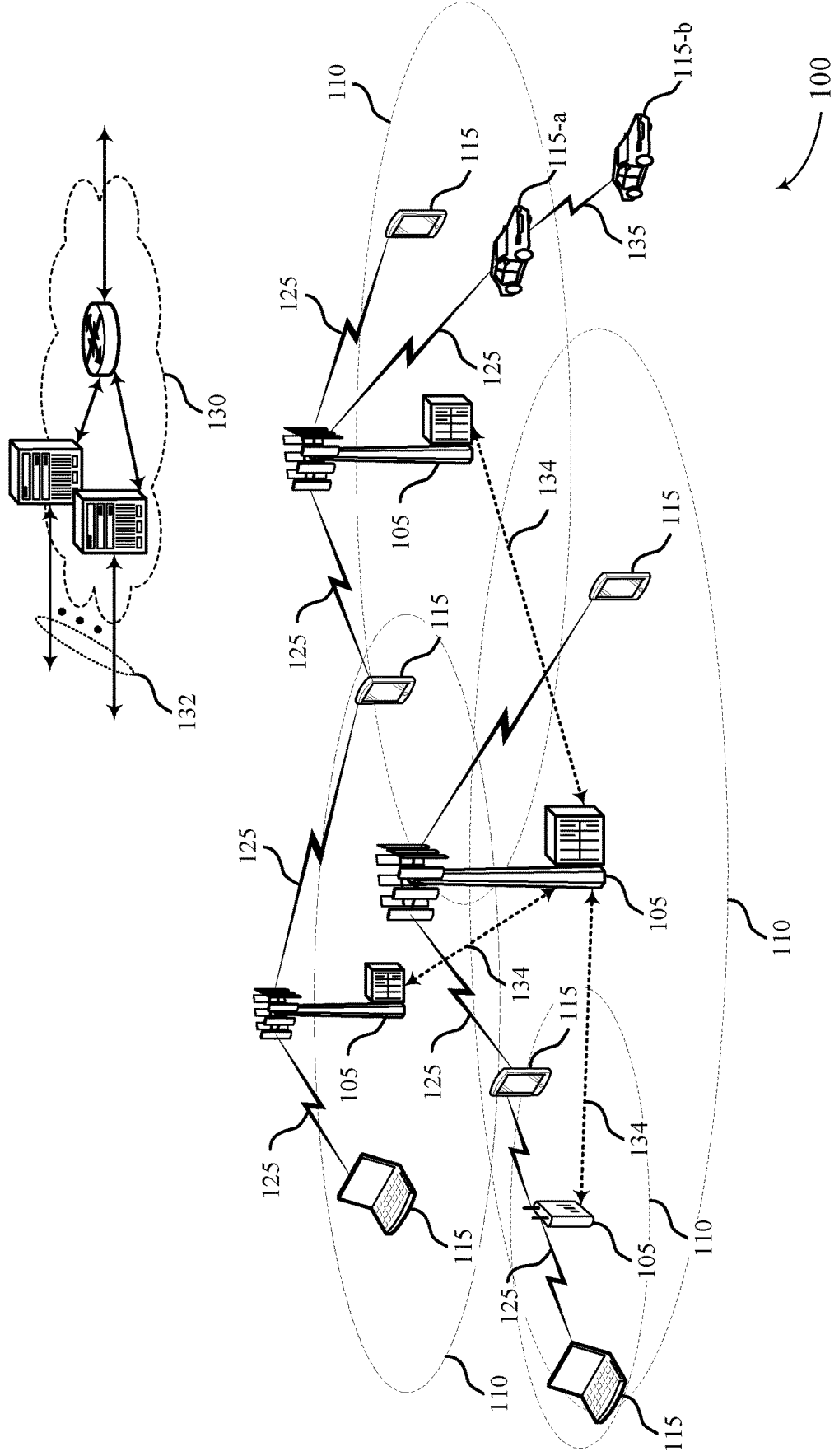
FIG. 1 illustrates an example of a system for wireless communications that supports noise tracking within transmission time intervals (TTIs) in wireless communications in accordance with aspects of the present disclosure.

Some wireless communication systems may be used to facilitate communications with various devices, which may include distributed communications systems that allow for direct device-to-device (D2D) communications between wireless devices (e.g., between two user equipment (UE) devices). In some cases, different transmitters within a distributed communications system may transmit during different portions of a transmission time interval (TTI). In various aspects of the present disclosure, described techniques provide for transmission of reference signals that can allow a receiving device to estimate noise during different portions of a TTI and compensate for varying noise levels within the TTI.

In some cases, a transmitting device may determine that one or more first reference signals (e.g., one or more demodulation reference signals (DMRSs)) are present in a first set of symbols within the TTI, but are not present in a second set of symbols within the TTI that may have a different expected noise level. To provide for more accurate noise estimation of the second set of symbols, a second reference signal (e.g., another instance of the DMRS, a noise tracking reference signal (NTRS), or some other reference signal) may be transmitted in the second set of symbols. A receiving device (e.g., a receiving UE in a D2D communications system) may estimate the different noise levels for the first set of symbols and the second set of symbols based on the corresponding first and second reference signals, and use the noise estimations to aid in demodulation of received signals within the TTI.

In some cases, a transmitting UE may identify different sets of symbols within a TTI that are expected to have different signal to interference and noise (SINR) levels at a receiving UE. In some cases, such identification may be based on, for example, specified sets of symbols within the TTI that may have different SINR levels in the event that a different transmitting UEs within proximity of the receiving UE start or stop transmissions at boundaries of the specified sets of symbols. In some cases, such identification of different sets of symbols may be based on a configuration for a resource pool that contains the TTI that may be received via radio resource control (RRC) signaling. In some cases, the transmitting UE may determine that one or more first reference signals are to be transmitted in a first set of symbols within the TTI that may allow for noise estimation at the receiving UE for the first set of symbols. The transmitting UE may also determine that one or more second reference signals are to be added to a second set of symbols in order to allow for noise estimation at the receiving UE for the second set of symbols.

In some cases, a receiving UE may receive the transmission during the TTI from the transmitting UE, and may determine that the one or more first reference signals are transmitted in the first set of symbols and that the one or more second reference signals are transmitted in the second set of symbols. The receiving UE may use the one or more first reference signals to estimate a first noise level of the first set of symbols, and use the one or more second reference signals to estimate a second noise level of the second set of symbols. The first noise level and the second noise level may then be used to aid in demodulating the transmission.

In some examples, the UEs may be associated with vehicles and these systems may sometimes be referred to as vehicle-to-vehicle (V2V) or vehicle-to-everything (V2X) communication systems. While various examples provided herein describe V2V or V2X communication, techniques provided herein may be used in any distributed communications system in which different transmitters may start and stop transmissions at different times within a TTI. In examples with V2X communications systems, direct transmission via sidelink communications may be configured to convey important information between vehicles, such as vehicle speed and direction, changes in vehicle speed and direction, inclement weather information, nearby accidents, road conditions, the activities of nearby vehicles, and the like. V2X communication systems may also be used by autonomous vehicles (self-driving vehicles) and may provide extra information beyond the reach of the vehicle's existing system. For example, a sensor device in a first vehicle may transmit sensor information to a second vehicle (e.g., indicative of objects or conditions in the vicinity of the sensor, a video feed of the first vehicle to enhance a line-of-sight at the second vehicle, etc.). The second vehicle may receive the information and may thereby determine whether and how to take action based on the sensed objects or conditions. Accordingly, reliable reception of such communications with relatively low latency is important in such deployments. Techniques for noise tracking across different portions of a TTI such as discussed herein provide the benefit of enhanced likelihood of successful demodulation and decoding of communications transmitted within a TTI, which may enhance system efficiency, reliability, and latency. Further, techniques provided herein provide for enhanced likelihood of successful transmissions while incurring relatively low additional overhead, which further helps enhance overall system efficiency.

Aspects of the disclosure are initially described in the context of a wireless communications system. Various examples of slot configurations and reference signal configurations are then described that support noise tracking within TTIs. Aspects of the disclosure are further illustrated by and described with reference to apparatus diagrams, system diagrams, and flowcharts that relate to noise tracking within TTIs in wireless communications.

FIG. 1 illustrates an example of a wireless communications system 100 that supports noise tracking within TTIs in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, wireless communications system 100 may support D2D or V2X communications between UEs 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, or proximity based services (ProSe) direct communications). Sidelink communication may be used for D2D media-sharing, vehicle-to-vehicle (V2V) communication, V2X communication (or cellular V2X (cV2X) communication), emergency rescue applications, etc. One or more of a group of UEs 115, such as UE 115-*a* and UE 115-*b* that may be associated with vehicles may utilize such D2D communications for direct communications that are not transmitted via a base station 105. In some cases, a UE 115 utilizing D2D communications, such as UE 115-*a*, may be within the geographic coverage area 110 of a base station 105. Other UEs 115, such as UE 115-*b*, in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to one or more other UEs 115 in a group. In some cases, a base station 105 facilitates the scheduling of resources for D2D communications, such as by allocating a pool of resources that are available for D2D communications (e.g., certain periodic subframes may be configured for D2D communications). In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 7 modulation symbol periods (using a normal cyclic prefix) at a 15 kHz subcarrier spacing (SCS). In other cases, a 30 kHz SCS may be used, and each slot may contain 14 modulation symbols. Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., one or more slots, bursts of shortened TTIs (sTTIs), or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105, or for direct communications between UEs 115 using D2D techniques.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may support noise tracking within TTIs in order to enhance reliability of D2D communications where expected noise may have symbol-to-symbol variability. In various examples, different techniques provide for transmission of reference signals that can allow a receiving device to estimate noise during different portions of a TTI and compensate for varying noise levels within the TTI.

Figure 2:
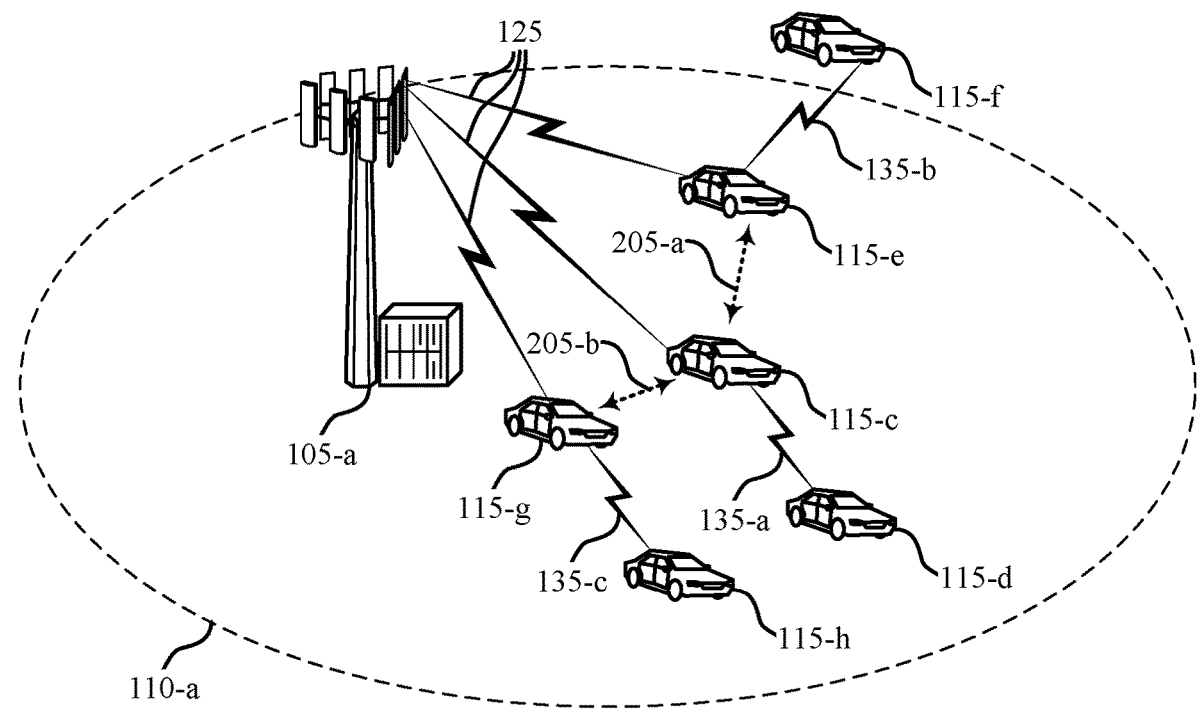
FIG. 2 illustrates an example of a portion of a wireless communications system that supports noise tracking within TTIs in wireless communications in accordance with aspects of the present disclosure.

FIG. 2 illustrates an example of a portion of a wireless communications system 200 that supports noise tracking within TTIs in wireless communications in accordance with aspects of the present disclosure. In some examples, wireless communications system 200 may implement aspects of wireless communications system 100. Wireless communications system 200 may include a base station 105-a and a number of UEs 115 that may be present in coverage area 110-a. In some cases, UEs 115 may be integrated within vehicles and wireless communications system may be a portion of a V2X system that supports distributed channel access and direct communications between UEs.

UEs 115 may be examples of UEs 115 described with reference to FIG. 1 and in this example, may be configured for V2X communication over one or more carriers. In some examples, UEs 115 may execute one or more sets of codes or sequences, to control the functional elements of the device, and perform some or all of the functions described herein. In some cases, a communications manager at each UE 115 may manage V2X communications and provide for noise tracking via multiple reference signal transmissions as discussed herein. While various examples described herein illustrate V2X communications using LTE or NR between UEs 115, it will be understood that techniques provided herein may be used in communications systems other than V2X systems, and that may use different radio access technologies (RATs) and communications protocols.

In this example, a first UE 115-c may establish direct communications with a second UE 115-d via sidelink 135-a, a third UE 115-e may establish direct communications with a fourth UE 115-f via sidelink 135-b, and a fifth UE 115-g may establish direct communications with a sixth UE 115-h via sidelink 135-c. In this example, each of the first UE 115-c, third UE 115-e, and fifth UE 115-g may have a communications link 125 with a serving base station 105-a, although in some cases each UE 115 may have such a communications link with the base station 105-a.

In some cases, base station 105-a may allocate a pool of resources for sidelink communications, and UEs 115 may perform a contention-based access procedure before initiating a transmission within the allocated resources. In some cases, the contention-based access procedure may be a listen-before-talk (LBT) procedure, in which a UE 115 seeking to transmit may determine a number of subchannels it wants to transmit and contends for access to the determined number of subchannels by monitoring for other UEs 115 transmitting on the determined number of subchannels. In some cases, an LBT counter may be used to determine when to monitor for other transmissions. For example, if an LBT counter is set to zero, a UE 115 may simply transmit an LBT sequence in a first symbol within a slot and the UE 115 may start transmitting beginning at a second symbol within the slot. In some cases, the LBT counter may be set to one (or two), in which case the UE 115 monitors for other transmissions for one or more symbols and then transmits the LBT sequence in a subsequent symbol if no transmissions are detected. If another transmission is detected, the UE 115 may select different subchannels and repeat the procedure.

In such cases, different UEs 115 may thus start transmitting at different points within a slot or TTI. For example, second UE 115-d may initiate transmissions to the first UE 115-c using sidelink 135-a in second symbol of a slot, while the third UE 115-e may initiate transmissions to the fourth UE 115-f in a third symbol of the slot. Further, in some cases, fifth UE 115-g may aggregate transmissions across two or more slots to sixth UE 115-h, which may result in one or more symbols later in a slot being used for transmissions that may not be used by any other UEs 115. Thus, the first UE 115-c, when receiving transmissions from the second UE 115-d, may also receive interference due to the other transmissions of other UEs 115, such as interference 205-a from the transmissions of third UE 115-e, and interference 205-b from the transmission of fifth UE 115-g.

In some examples, the transmitting second UE 115-d may identify different sets of symbols within a TTI that are expected to have different signal to interference and noise (SINR) levels at a receiving first UE 115-c. The transmitting second UE 115-d may determine that one or more first reference signals, such as DMRSs, are to be transmitted in a first set of symbols within the TTI that may allow for noise estimation at the receiving first UE 115-c for the first set of symbols. The transmitting second UE 115-d may also determine that the one or more first reference signals are not present in a second set of symbols, and may add one or more second reference signals to the second set of symbols in order to allow for noise estimation at the receiving first UE 115-c for the second set of symbols.

The first UE 115-c may receive the transmission during the TTI from the second UE 115-d, and may determine that the one or more first reference signals are transmitted in the first set of symbols and that the one or more second reference signals are transmitted in the second set of symbols. The first UE 115-c may use the one or more first reference signals to estimate a first noise level of the first set of symbols (e.g., a noise level associated with interference 205 from both the third UE 115-e and fifth UE 115-g), and use the one or more second reference signals to estimate a second noise level of the second set of symbols (e.g., a noise level associated with no expected interference 205 from the third UE 115-e and fifth UE 115-g). The first noise level and the second noise level may then be used to aid in demodulating the transmission.

Figure 3:
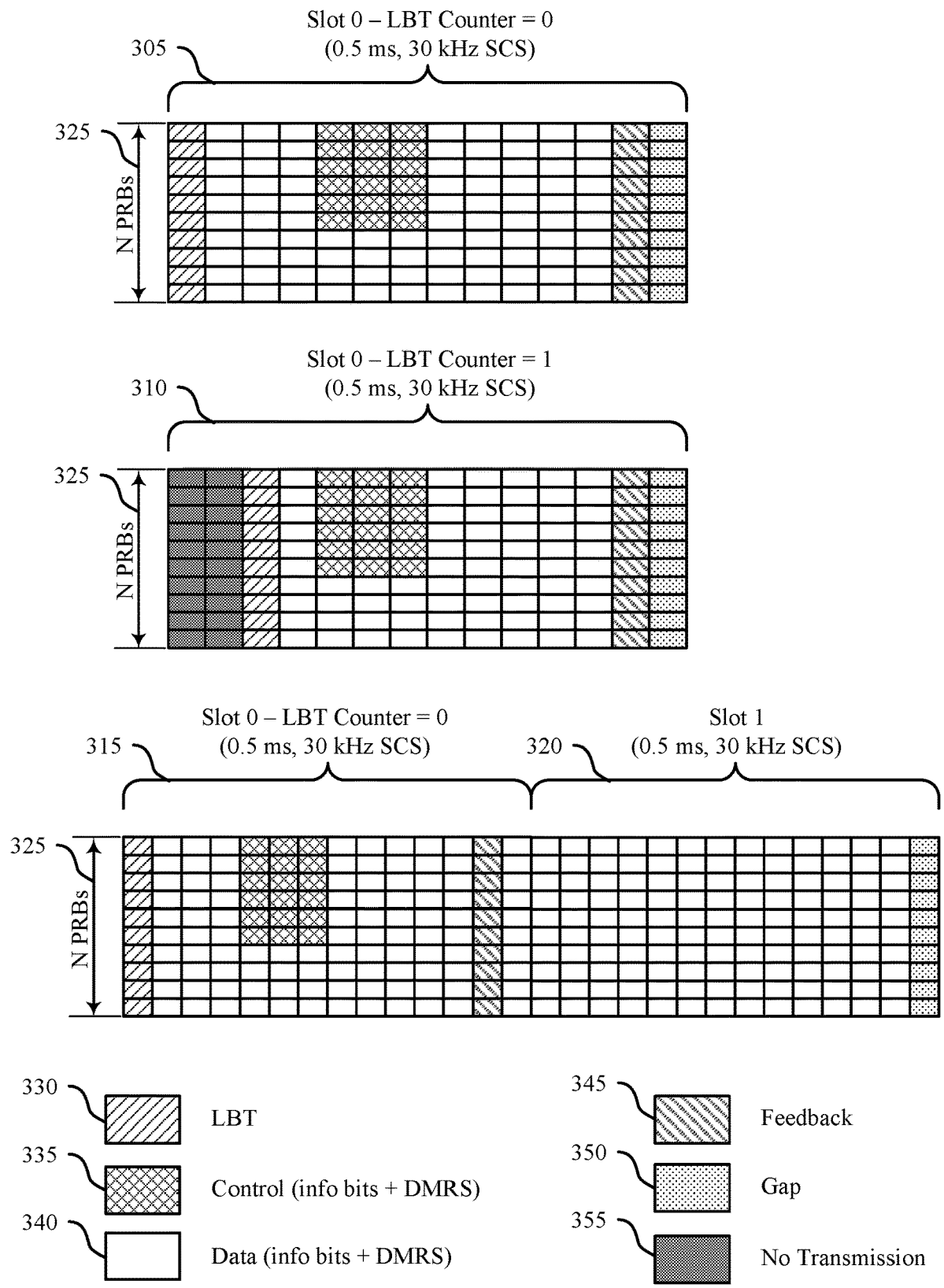
FIG. 3 illustrates an example of slot configurations within a TTI that support noise tracking within TTIs in wireless communications in accordance with aspects of the present disclosure.

FIG. 3 illustrates examples of slot configurations 300 within a TTI that supports noise tracking in wireless communications in accordance with aspects of the present disclosure. In some examples, slot configurations 300 may implement aspects of wireless communications system 100 or 200. As indicated above, distributed channel access mechanisms (e.g., NR V2X channel access mechanisms) can lead to SINR variations within a TTI. FIG. 3 provides a number of exemplary slot configurations that may be used with contention-based channel access (e.g., a LBT procedure) in a distributed communications system.

A first example slot configuration may include a number of symbols within a slot 305, that span a number (N) of physical resource blocks (PRBs) 325. In this example, an LBT counter may be set to zero, and the transmitting UE (e.g., a UE 115 of FIG. 1 or 2) may transmit an LBT sequence 330 in an initial symbol of slot 305, followed by transmissions of data 340 and control information 335. In this example, control information 335 may be transmitted in configured resources with the slot 305, and data 340 including information bits and DMRS transmissions may be transmitted in resources outside of the control information 335 resources within slot 305. In this example, feedback 345 (e.g., HARQ acknowledgment/negative acknowledgment feedback) may be received following the data 340 transmissions, and the UE may again start transmitting following a gap 350 that allows for configuration of transmit circuitry. In this example, slot 305 is 0.5 ms in duration and has a 30 kHz SCS, thus resulting in 14 symbols within the slot 305.

In a second example slot configuration, slot 310 may correspond to cases in which a transmitting UE has an LBT counter set to one. In such cases, the transmitting UE may listen during the initial symbol of the slot 310 to determine if any other transmitter UE is using the N PRBs 325 of that subchannel (e.g., the UE monitors for the LBT sequence). If the LBT sequence is not detected in the initial symbol, the UE may turnaround and start transmitting LBT sequence 330 in the third symbol of slot 310. The turnaround from monitoring in the initial symbol to transmitting in the third symbol may include switching receive circuitry to start transmitting, which may consume a portion of or all of the second symbol, thus resulting in a two symbol period 355 in which the UE has no transmissions. Again, in this example slot 310 has a second to last symbol left for feedback 345 transmission of receiving UEs, and has a last symbol left as gap for reception-to-transmission turnaround for the transmitting UE. In this example, slot 310 is 0.5 ms in duration and has a 30 kHz SCS, thus resulting in 14 symbols within the slot 310.

In a third example slot configuration, slots 315 and 320 may be aggregated in cases where additional data or lower coding rates may result in additional transmission resources used by a transmitting UE. In this example, the transmitting UE may have an LBT counter set to zero, and thus LBT sequence 330 may be transmitted in an initial symbol of first slot 315. In this example, due to the aggregation of slots 315 and 320, feedback 345 may have a same symbol location, but gap 350 symbol may be located at an end of the second slot 320. In this example, slots 315 and 320 are each 0.5 ms in duration and have a 30 kHz SCS, thus resulting in 14 symbols within the slots 315 or 320.

In some cases, a receiving UE may be in proximity to one or more other UEs that are operating using different slot configurations, and thus noise levels at the receiving UE may be different for different portions of a TTI. For example, if a receiving UE is receiving the first slot configuration of slot 305 and a neighboring transmitting UE is using the second slot configuration of slot 310, a first noise level may be expected during a second symbol of the slot, followed by a different second noise level that may be expected starting at a third symbol of the slot, corresponding to when the neighboring UE begins transmitting LBT sequence 330 within slot 310. If a reference signal is not available during the third symbol, the receiving UE may not be able to estimate noise during that symbol, which may degrade demodulation. Further, in some cases, is receive circuitry is calibrated according to a relative low noise level and a subsequent high noise level is present, amplifiers within the receive circuitry may saturate which may further degrade the receiving UE's ability to demodulate the received signals. An example of different expected noise levels, or different expected SINRs, is illustrated in FIG. 4.

Figure 4:
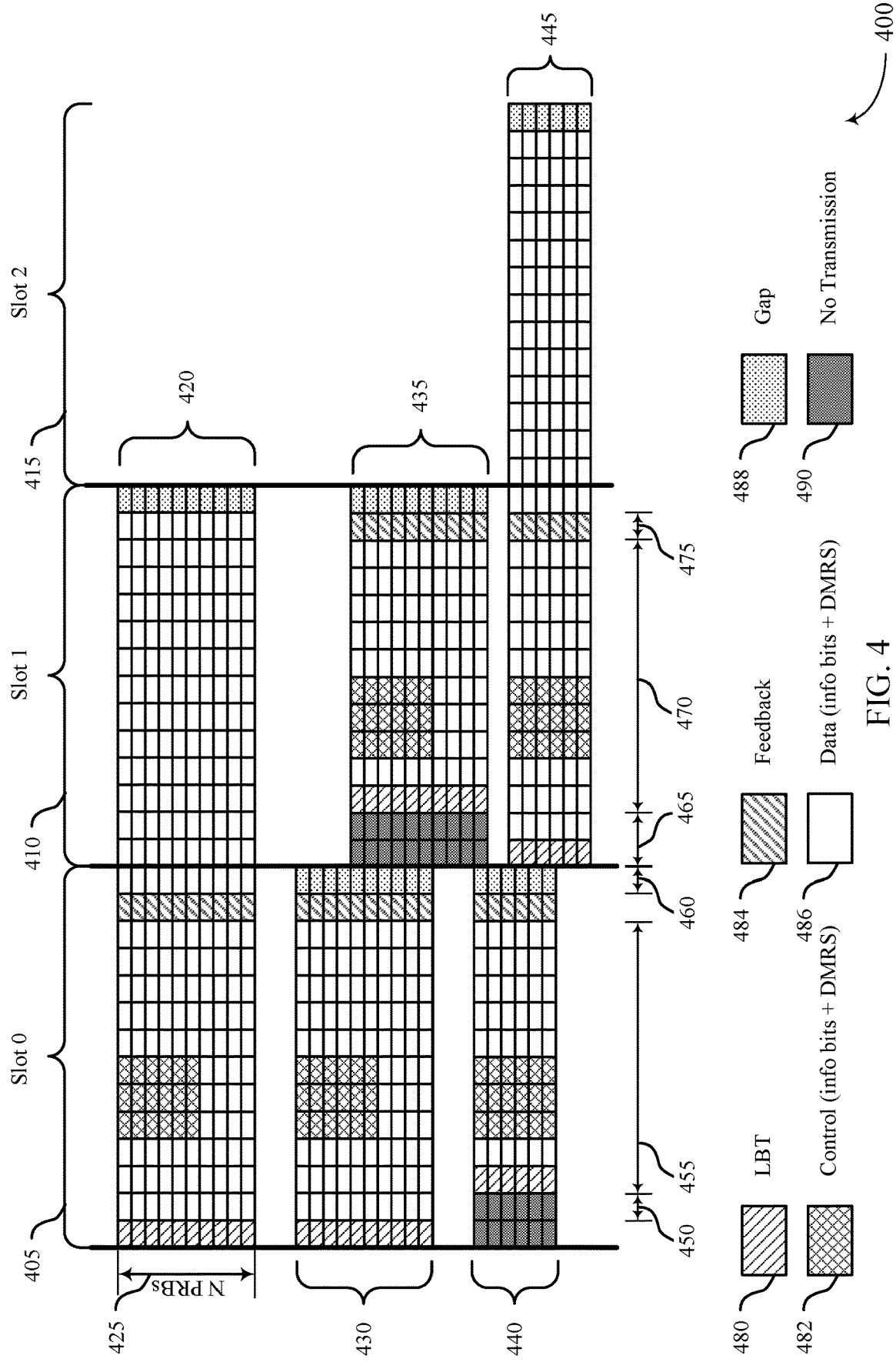
FIG. 4 illustrates an example of multiple transmissions and SINRs within a TTI that support noise tracking within TTIs in wireless communications in accordance with aspects of the present disclosure.

FIG. 4 illustrates an example of a multiple transmissions and SINRs 400 that support noise tracking within TTIs in wireless communications in accordance with aspects of the present disclosure. In some examples, multiple transmissions and SINRs 400 may implement aspects of wireless communications system 100 or 200. Similarly as discussed with reference to FIG. 3, in some cases, distributed channel access mechanisms (e.g. NR V2X channel access mechanisms) can lead to SINR variations within a TTI. In this example a TTI may include a first slot 405, a second slot 410, and a third slot 415, and symbol-to-symbol SINR variations may be present due to frequency division multiplexed (FDM'ed) transmissions with different slot aggregations within the TTI.

In this example, a first slot format 420 may aggregate first slot 405 and second slot 410 for N PRBs 425. The first slot format 420 may have an LBT counter of zero, thus providing LBT sequence 480 transmission in an initial symbol of the first slot 405. A second transmitting UE may use a second slot format 430 and be FDM'ed with the first slot format 420 in N PRBs. Second slot format may also have an LBT counter of zero and have LBT sequence 480 transmission in the initial symbol of the first slot 405. In this example, the second slot format 430 may only span the first slot 405, and another transmitting UE may use third slot format 435 and transmit in second slot 410 using different frequency resources that are FDM'ed with the first slot format 420. The third slot format 435 may have an LBT counter of one, and thus have no transmissions 490 during an initial two symbols while monitoring for other transmissions and changing over from receive to transmit.

In this example, a fourth slot format 440 may span relatively fewer PRBs, and be FDM'ed with the first slot format 420 and the second slot format 430 in the first slot 405. Fourth slot format 440 may have an LBT counter of one, and thus LBT sequence 480 may be transmitted during a third symbol of the first slot 405. Finally, a fifth slot format 445 may aggregate second slot 410 and third slot 415 and be FDM'ed with the first slot format 420 and the third slot format 435 in the second slot 410. Each of the slot formats may have LBT sequence 480, control information 482, feedback 484, data transmissions 486, and transmission gap 488. Further, the third slot format 435 and the fourth slot format 440 have no transmissions 490 in an initial two symbols due to the LBT counter being set to one.

In some examples, a receiving UE may attempt to receive transmissions provided in the first slot format 420. As discussed herein, due to the FDM'ed transmissions of other transmitting UEs, as well as the different slot formats and LBT counters, such a receiving UE may see SINR variations. In this example, such a receiving UE may have an expected first SINR 450 associated with transmissions in a second symbol of the first slot 405 associated with the first slot format 420 and the second slot format 430. The receiving UE may have an expected second SINR 455 starting at a third symbol of the first slot 405, which may be different than the first SINR 450 due to transmissions associated with the fourth slot format 440 starting. A third SINR 460 may be present in a last symbol of the first slot 405, followed by a fourth SINR 465 at the start of the second slot 410. A fifth SINR 470 may result from initiation of transmissions associated with the third slot format 435, which may continue until sixth SINR 475 at the end of the second slot 410 before the gap 488 at which point the receiving UE stops monitoring for the received transmission in the TTI.

The SINR variations may be due to, for example, total power on a symbol changing (e.g., as FDM'ed transmission start or stop) and affects quantization noise at the receiving UE. In some cases, automatic gain control (AGC) retraining may be needed to accommodate (e.g., if a low noise amplifier (LNA) saturates) power changes within a slot (e.g., symbol 3 of the first slot 405 or second slot 410) due to near-far effect, which may affect gain and quantization noise at the receiving UE. SINR variations may also be due to spatial reuse of resources, such that the interference on the desired set of resources is changing as well (in patterns similar to FDM'ed case) due to interfering transmission start-stop transitions of other UEs using the same PRBs.

In some cases, a transmitting UE may identify the different SINR variations for a TTI, and may determine if one or more symbols associated with each different SINR variation has an associated reference signal that the receiving UE may use to estimate noise. In some cases, the transmitting UE may include one or more reference signals in one or more symbols where a reference signal is not otherwise available for a particular expected SINR. For example, DMRS transmissions may be configured for certain symbols within the TTI, which the receiving UE may use for noise covariance estimation. However, if a DMRS is not present in a set of symbols associated with a particular SINR, the receiving UE may not be able to reliably estimate the noise covariance, which may degrade demodulation at the receiving UE and reduce the likelihood of successfully demodulating and decoding communications transmitted during the TTI. Thus, by having the transmitting UE include reference signals in such a set of symbols, the receiving UE may obtain a more reliable estimation of noise covariance and increase the likelihood of successfully demodulating and decoding communications transmitted during the TTI.

Figure 5:
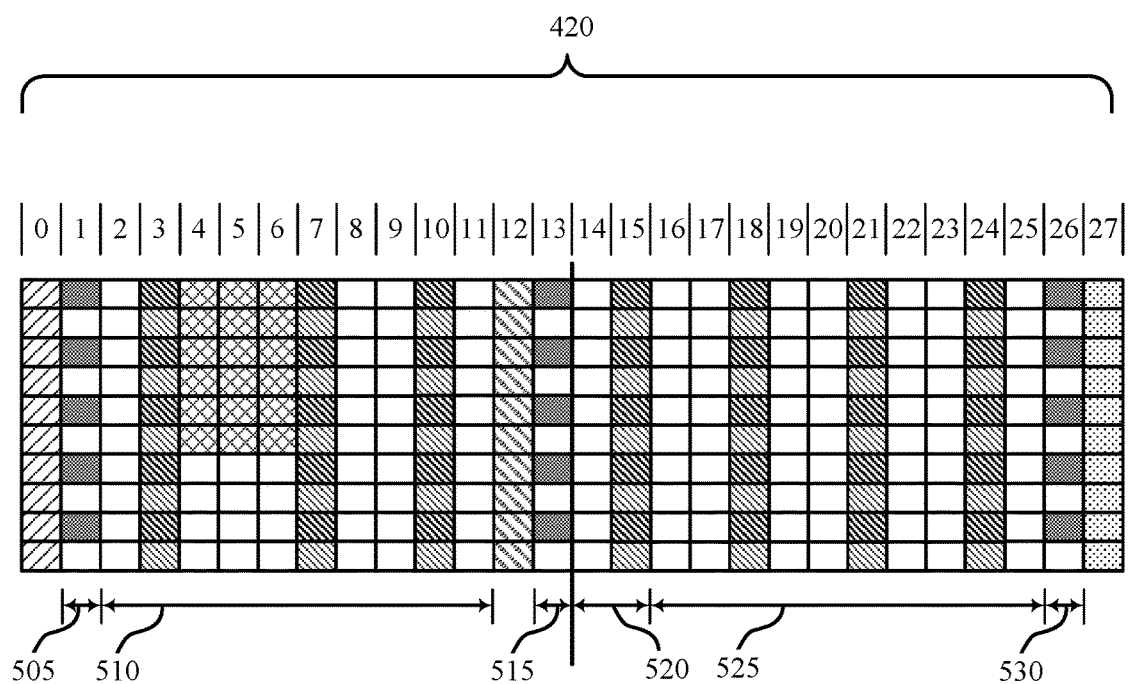
FIG. 5 illustrates an example of a reference signal configuration that supports noise tracking within TTIs in wireless communications in accordance with aspects of the present disclosure.
Figure 5:
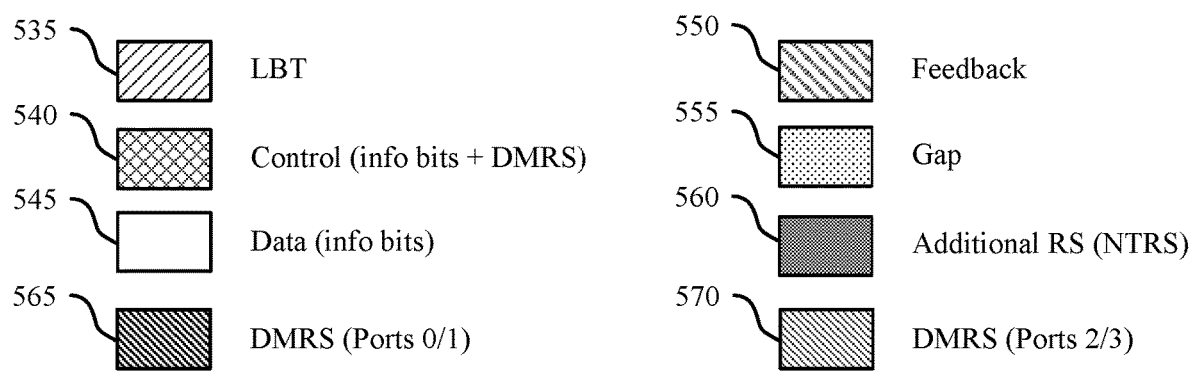

FIG. 5 illustrates an example of a reference signal configuration 500 that supports noise tracking within TTIs in wireless communications in accordance with aspects of the present disclosure. In some examples, reference signal configuration 500 may implement aspects of wireless communications system 100 or 200. In this example, a transmitting UE may transmit using a first slot format 420 to a receiving UE. Further, in this example, multiple other transmitting UEs may transmit using other slot formats as discussed with reference to FIG. 4, thus providing multiple different expected SINRs, including a first SINR 505 at symbol one, a second SINR 510 at symbols two through 11, a third SINR 515 at symbol 13, a fourth SINR 520 at symbols 14 to 15, a fifth SINR 525 at symbols 16 through 25, and a sixth SINR 530 at symbol 26.

In this example, LBT sequence 535 may be transmitted at symbol 0, control information 540 may be transmitted at symbols four through six, and data 545 may be transmitted at symbols four through 11 and 13 through 26. Feedback 550 may be provided in symbol 12, and a transmission gap 555 may be provided at symbol 27. Further, in this example, DMRSs may be transmitted in certain configured symbols, which may include DMRS for antenna ports 0/1 565, and DMRS for antenna ports 2/3 570, configured in symbols 3, 7, 10, 15, 18, 21, and 24. Thus, one or more DMRSs are associated with sets of symbols having second SINR 510, fourth SINR 520, and fifth SINR 525. Similarly, one or more DMRSs are not associated with sets of symbols having first SINR 505, third SINR 515, or sixth SINR 530. In this example, in order to allow for the receiving UE to obtain a reliable noise estimate for the first SINR, third SINR 515, and sixth SINR, an additional reference signal 560 (e.g., another instance of a DMRS or a noise tracking reference signals (NTRS)) is provided in symbol 1, symbol 13, and symbol 26, that may allow the receiving UE to perform SINR or noise tracking, which may be used for log likelihood ratio (LLR) computation and demodulation of the received communications within the TTI.

In some examples, a reference signal may be added through repeating DMRS transmissions (e.g., for all ports used for transmission) on one or more symbols where SINR variations are expected and a DMRS is not present. Such reference signals may provide noise and interference tracking per-port, and may allow tracking when interference is varying per-port (e.g., rank 1 vs rank-2 interference). In other examples, such as illustrated in FIG. 5, an additional reference signal 560 (e.g., a NTRS) may be transmitted with a reduced number of antenna ports compared to DMRSs 565 and 570 on the identified symbols or set of symbols. Such an additional reference signal 560 allows for noise estimation at the receiving UE, and uses less overhead than full repetitions of DMRSs 565 and 570. Further, in some cases, the additional reference signal 560 may have enhanced performance relative to full repetitions of DMRSs 565 and 570 because it allows increased coding gain and, on average, relatively small loss with respect to interference. In some cases, the additional reference signal 560, or in cases where DMRSs are repeated, the added reference signals may be sparser in frequency as compared to DMRSs 565 and 570.

Accordingly, in some examples, the transmitting UE in such cases may determine the sets of symbols within the transmission time interval that may experience different SINR levels when being received at the receiving UE. In some cases, such a determination may be based on a prespecified configuration in which one or more sets of symbols of a particular slot format may be identified as having different expected SINR levels. In some cases, such a determination may be based at least in part on configuration information received via radio resource control (RRC)

signaling that may indicate a configuration or preconfiguration for the resource pool for the transmission. For example, SINR level variation between different symbols of the TTI may depend on the number of LBT symbols, a maximum LBT counter value that is configured or preconfigured for the resource pool, or any combination thereof. While the examples of FIGS. 3 and 4 show LBT counters of zero and one, other cases may have different maximum LBT counter values (e.g., LBT counters of 0, 1, or 2), in which cases SINR variations may occur on additional symbols 1-2, 3-4, and 5. In the case of the example of FIG. 4, with RRC configuration of a maximum LBT counter of one, a transmitting UE LBT counter of zero, and two slot aggregation (providing data/control at symbols {1-11, 13-26}), the transmitting UE may determine the following sets of symbols with potentially varying SINR at the receiving UE: Set 0: {1}; Set 1: {2-11}; Set 2: {13}; Set 3: {14, 15}; Set 4: {16-25}; Set 5: {26}.

The transmitting UE may also determine whether additional reference symbols are needed to aid the receiving UE to track SINR/noise for each of the determined sets of symbols. In some cases, as indicated above, such a determination may be based on presence of DMRS on one or more of the symbols within that set. For example, if a set of symbols already has symbols with DMRSs 565, 570, then an additional RS is not needed because channel and noise estimation may be performed using the DMRSs 565 and 570 for each antenna port. In symbol sets where no DMRS is present in the set (e.g., set 0 or set 2), then additional reference signal 560 may be added for the receiving UE to determine the noise variance and to accurately scale the LLRs on symbols in such symbol sets. In the example of FIG. 5, set 0, set 2, and set 5 are provided with additional reference signal 560.

Additionally or alternatively, the transmitting UE may determine to add additional reference signal 560 transmissions to one or more sets of symbols based on one or more characteristics of other reference signals (e.g., DMRSs 565 and 570) in the sets of symbols. For example, a transmitting UE may make a determination to add additional reference signal 560 based at least in part on a time-density of DMRSs 565 and 570 within the set of symbols. For example, if a time density of the DMRSs 565 and 570 is less than a threshold value (e.g., once every three symbols) an additional reference signal 560 may be added within a set of symbols. In some cases, if an earliest symbol within a set of symbols with a DMRS 565 or 570 occurs after a threshold value after the start of the set of symbols (e.g., if the first DMRS 565 or 570 occurs at a third symbol or later of a set of symbols), an additional reference signal 560 may be added before the first DMRS 565 or 570 within the set of symbols. Such a technique may provide improved demodulation latency by having the additional reference signal 560 earlier in the set of symbols that may allow the receiving UE to obtain an updated noise variance. In some cases, the transmitting UE may determine to add additional reference signal 560 based on a minimum spacing between reference signals (e.g., DMRSs 565 and 570) within a set of symbols. In some cases, additional reference signal 560 may be added by the transmitting UE when a spacing between a DMRS 565 or 570 adjacent sets of symbols is less than the minimum spacing.

In some cases one or more of the additional reference signals 560 may be added that have a same frequency density as the DMRSs 565 and 570 used in other sets of symbols. Further, in some cases the one or more additional reference signals 560 may use the same antenna ports as the DMRSs 565 and 570, and thus effectively add another instance of DMRS. In other cases, the one or more additional reference signals 560 may have a reduced frequency density compared with the DMRSs 565 and 570 used in other symbols, such as illustrated in FIG. 5. In some cases, the frequency density of the one or more additional reference signals 560 may be selected by the transmitting UE based on the data allocation size (i.e., the frequency span of the allocation) or the number of PRBs selected for the transmission. In some cases, the frequency density of the one or more additional reference signals 560 may be lower when data allocation size is higher, and may be higher when the data allocation size is lower. Additionally or alternatively, the transmitting UE may select the frequency density of the one or more additional reference signals 560 based at least in part on a MCS of the data transmission.

Further, in some cases, data 545 transmissions may be transmitted using multiple antenna ports, and the one or more additional reference signals 560 may be transmitted with reduced or a sparser number of antenna ports compared to antenna ports of the DMRSs 565 and 570. In some cases, the one or more additional reference signals 560 may use one port that is associated with the lowest indexed DMRS port. In some cases, the one or more additional reference signals 560 may use one port that is quasi-co-located (QCL) with all the DMRS ports (e.g., with respect to delay spread, average delay, doppler spread, doppler shift, and spatial reception). In some cases, the number of additional reference signal 560 antenna ports and QCL relationships with DMRS ports is configured via RRC signaling, a preconfigured relationship is indicated, or may be prespecified. In some cases, when data 545 transmissions use multiple antenna ports, the one or more additional reference signals 560 may be transmitted corresponding to each DMRS port (i.e., the number of ports for additional reference signals 560 corresponds to the number of ports for DMRSs 565 and 570). In such cases, an additional reference signal 560 transmission for port-k may thus be QCLed (e.g., with respect to delay spread, average delay, doppler spread, doppler shift, and spatial reception) with DMRS port-k.

In some cases, the transmitting UE, after determining to add the one or more additional reference signals 560 to one or more selected symbols, may indicate the configuration of the one or more additional reference signals 560 in the control information 540 transmission. The receiving UE may determine the reference signal configuration based on the indicated configuration and use received reference signals for data 545 demodulation. In some cases, the transmitting UE may indicate the configuration of the one or more additional reference signals 560 via a flag or single bit that indicates the one or more additional reference signals 560 are transmitted. The receiving UE in such a case may identify the one or more sets of symbols that have DMRSs 565 and 570 and may determine one or more sets of symbols that include the one or more additional reference signals 560. In such cases, characteristics of the one or more additional reference signals 560, such as symbol locations, frequency density, and antenna ports, may be determined by the receiving UE in a similar manner as discussed for the transmitting UE (e.g., based at least in part on MCS, size of allocation, time density thresholds, etc.).

The receiving UE may thus determine the configuration of the one or more additional reference signals 560 based at least in part on one or more of the control information 540, a configured or preconfigured resource pool configuration, or one or more other indications provided by the transmitting UE. In some cases the transmitting UE may use a particular LBT 535 sequence, or DMRS 565 or 570 sequence to indicate configuration of the one or more additional reference signals 560. For example, MCS of the data 545 transmissions may be included in control information 540, the resource pool configuration or indicated preconfiguration may include a maximum LBT counter and additional reference signal 560 antenna ports and QCL assumptions, and the LBT 535 sequence may indicate the frequency allocation, LBT counter used for transmission, and optionally may include the number of aggregated slots. In other examples, a cyclic shift of a DMRS sequence may indicate a number of aggregated slots. The receiving UE may then use the one or more additional reference signals 560 to aid with data demodulation, based on one or more of noise covariance estimations, channel estimations, or carrier frequency offset estimations that are based on the one or more additional reference signals 560.

Figure 6:
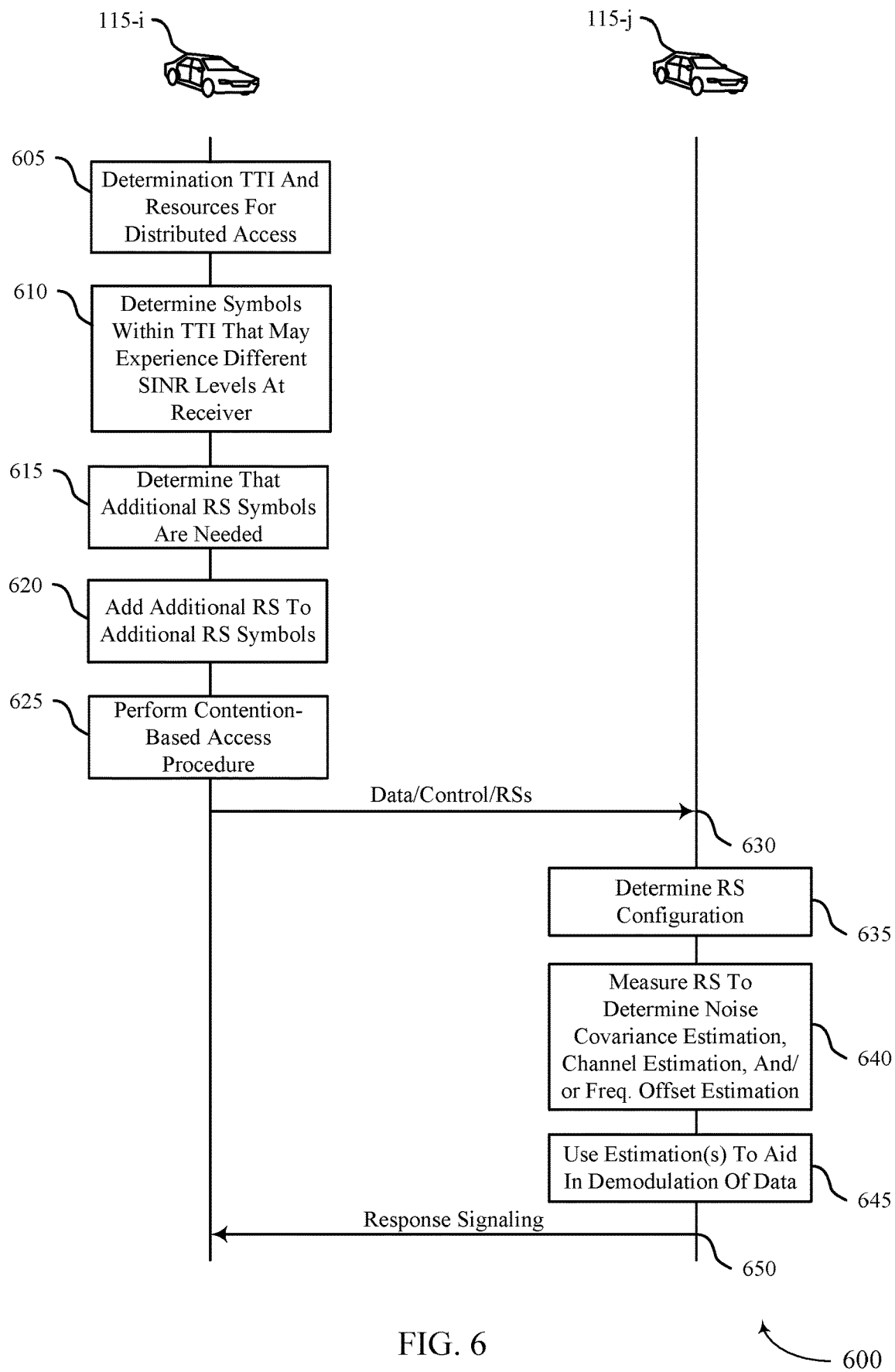
FIG. 6 illustrates an example of a process flow that supports noise tracking within TTIs in wireless communications in accordance with aspects of the present disclosure.

FIG. 6 illustrates an example of a process flow 600 that supports noise tracking within TTIs in wireless communications in accordance with aspects of the present disclosure. In some examples, process flow 600 may implement aspects of wireless communications system 100 or 200. Process flow 600 may include a first UE 115-i and a second UE 115-j, and may represent aspects of techniques performed by the corresponding UEs as described with reference to FIGS. 1-5.

At 605, the first UE 115-i, which may be a transmitting UE, may determine TTI and resources for distributed access, for initiating direct communications with the second UE 115-j. In some cases, the TTI and resources may be determined based on a resource pool that is configured by a serving base station for direct UE communications (e.g., periodic resources such as one or more periodic subframes). In some cases, the TTI and resources may be determined based on an amount of data to be transmitted, a coding rate that is to be used for the transmission, and the like, and a number of PRBs, slot aggregation, or combinations thereof may be selected.

At 610, the first UE 115-i may determine symbols within the TTI that may experience different SINR levels at the receiving UE 115-j. In some cases the first UE 115-i may determine one or more sets of symbols that may have different expected SINR levels based on one or more slot configurations and available slot aggregation that are available for direct UE communications, such as in a manner is discussed with respect to FIGS. 1-5.

At 615, the first UE 115-i may determine that additional reference signal symbols are needed. In some cases, the first UE 115-i may make such a determination based on one or more first reference signals (e.g., one or more DMRSs) that may be configured within the TTI, and which symbols contain the one or more first reference signals. In some cases, different sets of symbols may be identified that have different expected SINRs or expected noise levels, and the first UE 115-i may identify that one or more of the sets of symbols do not contain one or more of the first reference signals. The first UE 115-i, based on such an identification, may determine to add one or more additional RSs, which may be an example of a second reference signal, to one or more of the symbols in the identified sets of symbols. In some cases, the first UE 115-i may determine to add an additional reference signal based on a time density of the one or more first reference signals, a location of the one or more first reference signals within a set of symbols, a spacing between instances of the one or more first reference signals, or any combinations thereof.

At 620, the first UE 115-i may add the one or more additional reference signals to the additional reference signal symbols. In some cases, the one or more additional reference signals may be added using a reduced frequency density relative to the one or more first reference signals. In some cases, the one or more additional reference signals may use antenna ports that are QCLed with antenna ports of the one or more first reference signals. In some cases, the one or more additional reference signals may use a single antenna port that is QCLed with each antenna port of the one or more first reference signals.

At 625, the first UE 115-i may perform a contention-based access procedure to gain access to the resources for direct communications with the second UE 115-j. In some cases, the contention-based access procedure may be a LBT procedure. In some cases, an LBT counter may be used and the LBT procedure performed based on the LBT counter. For example, if an LBT counter is set to zero, the first UE 115-i may transmit a LBT sequence in an initial symbol to indicate to other UEs that the channel is occupied. In other examples, if the LBT counter is set to one or two, the first UE 115-i may monitor for transmissions of other UEs during an initial one or two symbols, and transmit the LBT sequence in the event that no other transmissions are detected. Following the contention-based access procedure, the first UE 115-i may transmit data, control, and reference signal transmissions at 630 to the second UE 115-j.

At 635, the second UE 115-j may determine the reference signal configuration of the transmission from the first UE 115-i. In some cases, the second UE 115-j may determine the reference signal configuration based on an indication provided by the first UE 115-i, such as an indication provided in the control information (e.g., a flag that indicates additional reference signals are included, or an explicit indication of symbols that include reference signals provided in control information). In some cases, the reference signal configuration may be determined based at least in part on one or more of control information, a sequence used for the LBT sequence, a reference signal sequence used for one or more reference signal transmissions, a MCS of the transmission, a configured resource pool, a preconfigured resource pool that is indicated to the second UE 115-j, a maximum number of symbols configured for contention-based access, a number of aggregated slots included in the TTI, an index into a preconfigured mapping of reference signal symbol locations and frequency density, a cyclic shift used for a reference signal transmitted with control information that carries the indication, or any combinations thereof.

At 640, the second UE 115-j may measure the one or more first reference signals and the one or more additional reference signals to determine a noise covariance estimation, a channel estimation, a frequency offset estimation, or any combinations thereof. In some cases, the estimations of the second UE 115-j may be performed for each of a number of different sets of symbols that may each have a different expected noise level or SINR level. At 645, the second UE 115-j may use one or more of the estimations to aid in demodulation of data that is transmitted from the first UE 115-i. The second UE 115-j, in some cases, may transmit response signaling (e.g., HARQ feedback, etc.) at 650 back to the first UE 115-i.

Figure 7:
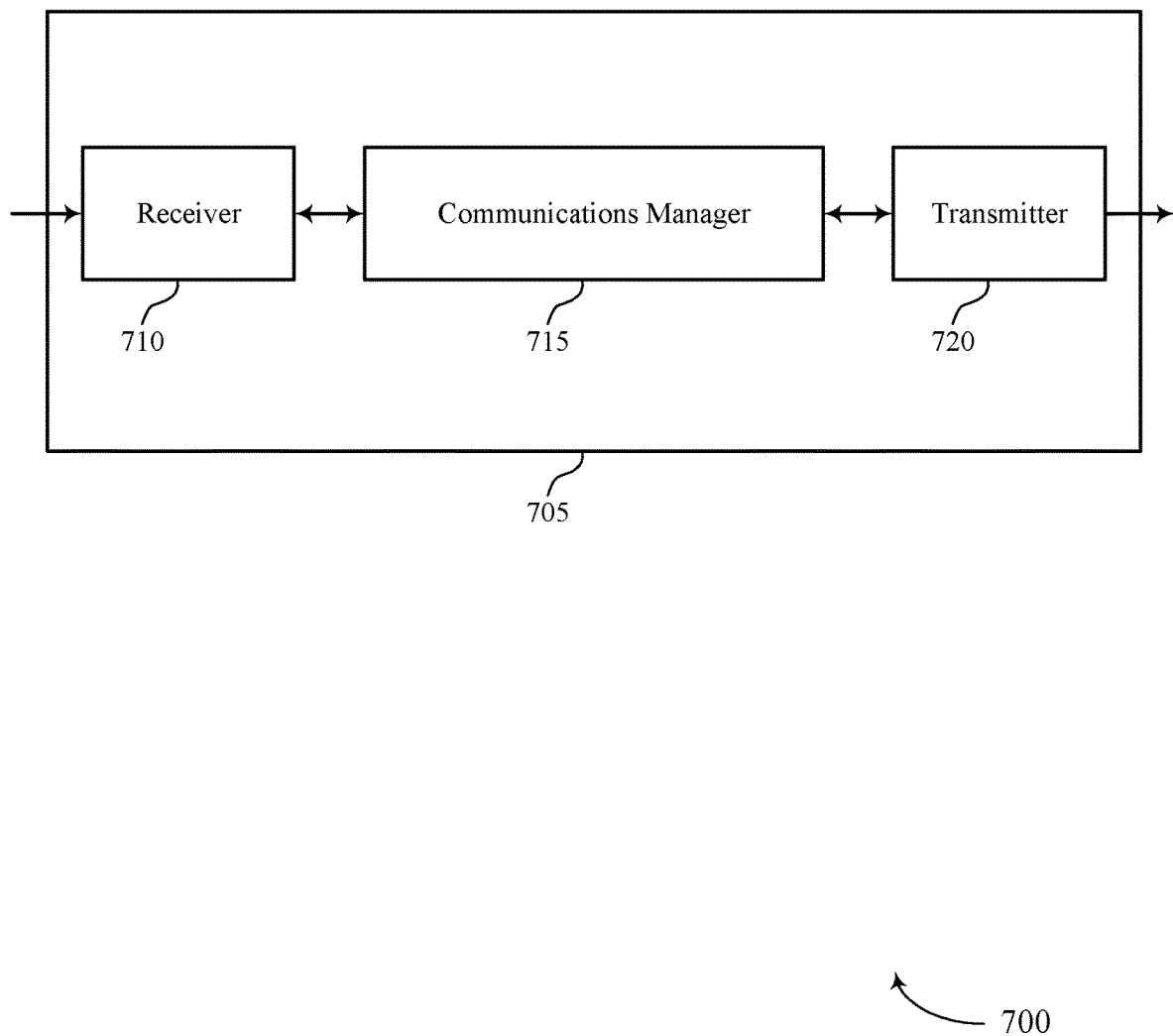
FIGS. 7 and 8 show block diagrams of devices that support noise tracking within TTIs in wireless communications in accordance with aspects of the present disclosure.

FIG. 7 shows a block diagram 700 of a device 705 that supports noise tracking within TTIs in wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to noise tracking within TTIs in wireless communications, etc.). Information may be passed on to other components of the device 705. The receiver 710 may be an example of aspects of the transceiver 1020 described with reference to FIG. 10. The receiver 710 may utilize a single antenna or a set of antennas.

In some cases, the device 705 may be a transmitting UE that transmits direct communications to a receiving UE, and the communications manager 715 may identify a first set of symbols within a TTI that have a first expected noise level and a second set of symbols within the TTI that have a second expected noise level, where the second set of symbols is different than the first set of symbols within the TTI and the first expected noise level is different than the second expected noise level, identify one or more first reference signals configured for the TTI, the one or more first reference signals in at least one symbol of the first set of symbols, determine one or more symbols in the second set of symbols that are to include one or more second reference signals based on the first expected noise level being different than the second expected noise level, and transmit the one or more first reference signals in the first set of symbols and the one or more second reference signals in the second set of symbols.

In some cases, the device 705 may be a receiving UE that receives direct communications from a transmitting UE, and the communications manager 715 may identify one or more first reference signals configured for a TTI, the one or more first reference signals in at least one symbol of a first set of symbols within the TTI, determine one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols, receive transmissions during the first set of symbols and the second set of symbols, and compute a first set of log likelihood ratios (LLRs) for the first set of symbols based on the first noise estimation, and computing a second set of LLRs for the second set of symbols based on the second noise estimation.

The communications manager 715 may be an example of aspects of the communications manager 1010 described herein. The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
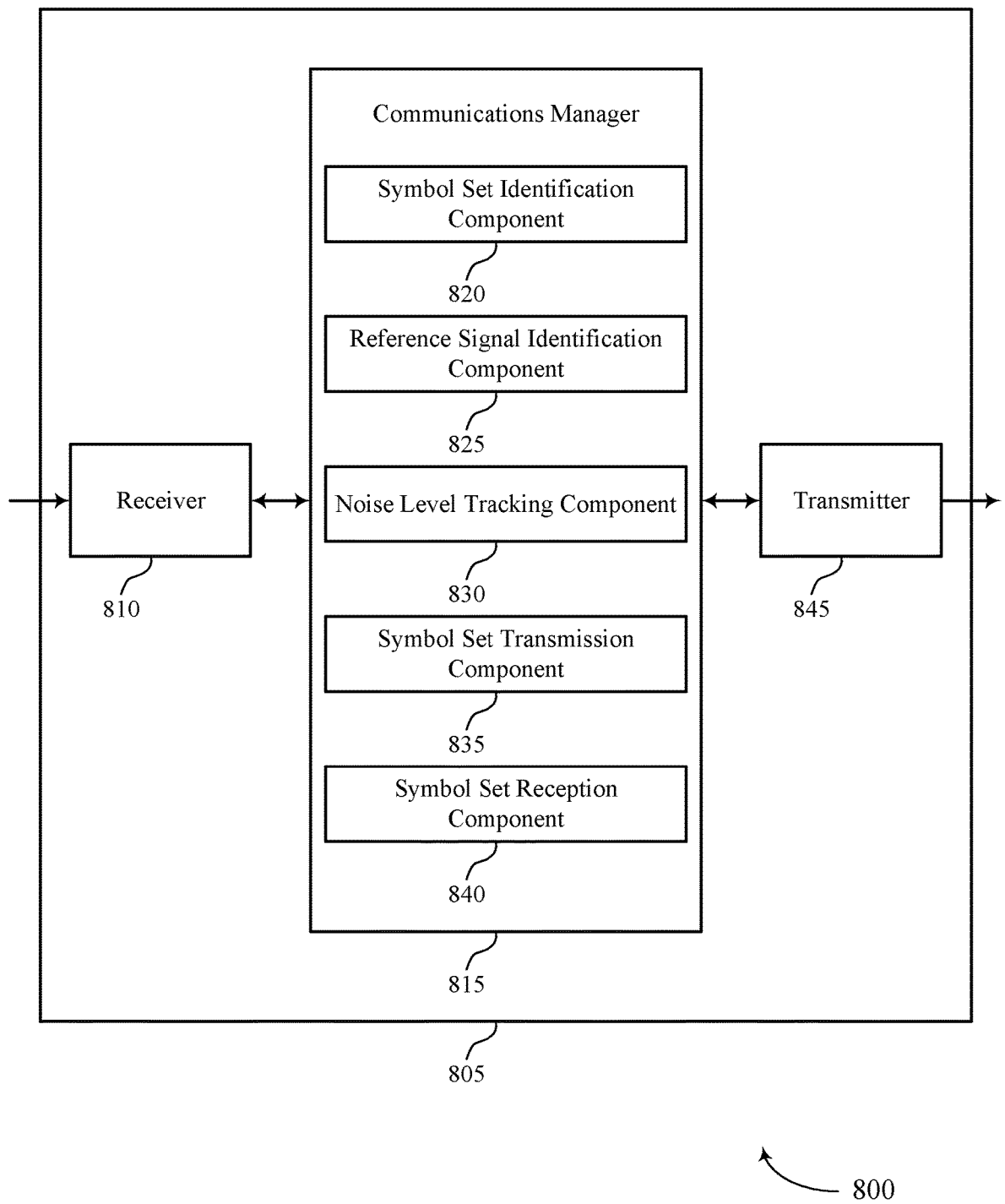

FIG. 8 shows a block diagram 800 of a device 805 that supports noise tracking within TTIs in wireless communications in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to noise tracking within TTIs in wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a symbol set identification component 820, a reference signal identification component 825, a noise level tracking component 830, a symbol set transmission component 835, and a symbol set reception component 840. The communications manager 815 may be an example of aspects of the communications manager 1010 described herein.

The symbol set identification component 820 may identify a first set of symbols within a TTI that have a first expected noise level and a second set of symbols within the TTI that have a second expected noise level, where the second set of symbols is different than the first set of symbols within the TTI and the first expected noise level is different than the second expected noise level.

The reference signal identification component 825 may identify one or more first reference signals configured for the TTI, the one or more first reference signals in at least one symbol of the first set of symbols. In some cases, the reference signal identification component 825 may identify one or more first reference signals configured for a TTI, the one or more first reference signals in at least one symbol of a first set of symbols within the TTI and determine one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols.

The noise level tracking component 830 may determine one or more symbols in the second set of symbols that are to include one or more second reference signals based on the first expected noise level being different than the second expected noise level. In cases where device 805 is a receiving UE in direct communications with a transmitting UE, the noise level tracking component 830 may compute a first set of log likelihood ratios (LLRs) for a first set of symbols based on a first noise estimation, and compute a second set of LLRs for a second set of symbols based on a second noise estimation, which may be based on the one or more first reference signals and the one or more second reference signals, respectively.

The symbol set transmission component 835 may transmit the one or more first reference signals in the first set of symbols and the one or more second reference signals in the second set of symbols. The symbol set reception component 840 may receive transmissions during the first set of symbols and the second set of symbols.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
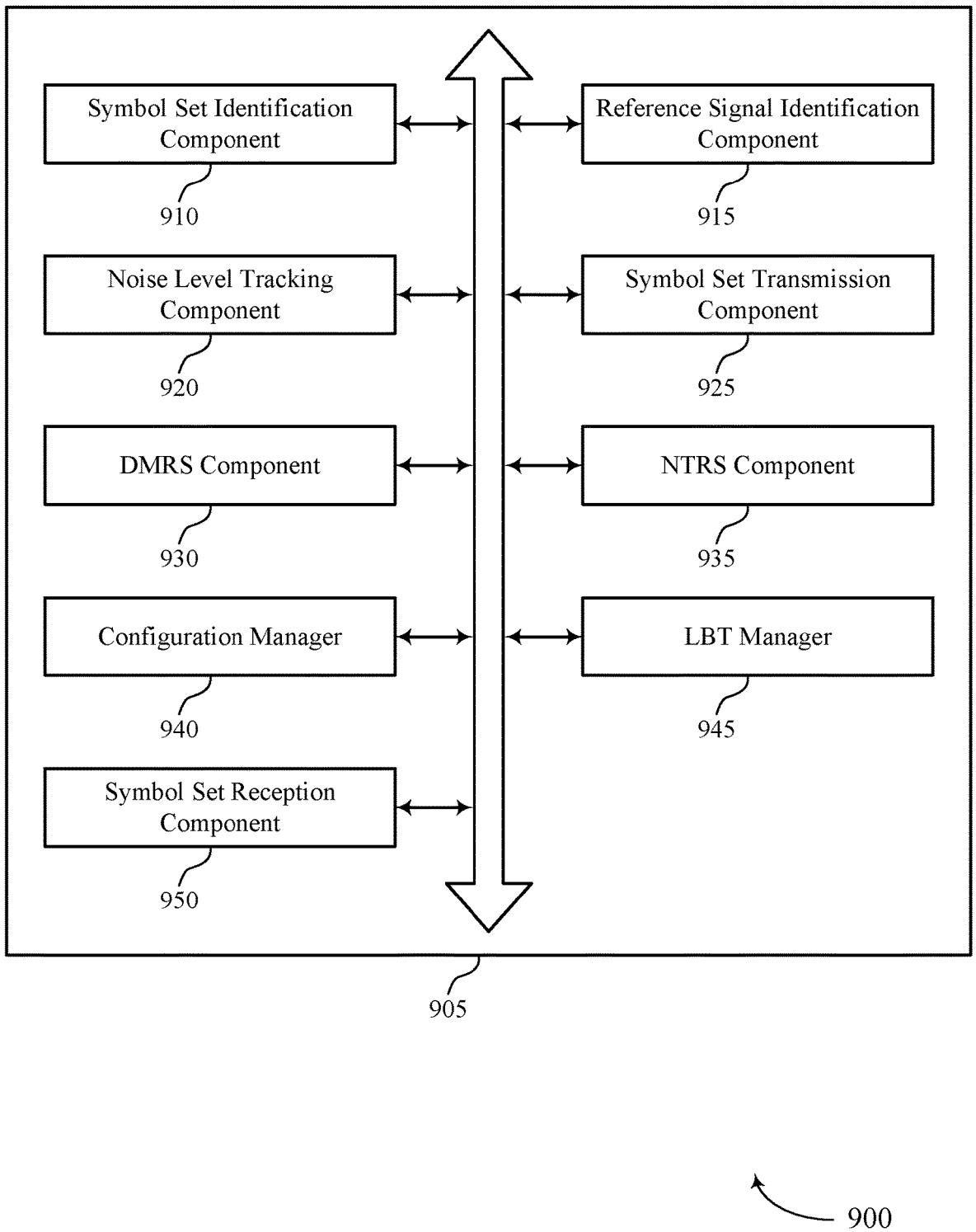
FIG. 9 shows a block diagram of a communications manager that supports noise tracking within TTIs in wireless communications in accordance with aspects of the present disclosure.

FIG. 9 shows a block diagram 900 of a communications manager 905 that supports noise tracking within TTIs in wireless communications in accordance with aspects of the present disclosure. The communications manager 905 may be an example of aspects of a communications manager 715, a communications manager 815, or a communications manager 1010 described herein. The communications manager 905 may include a symbol set identification component 910, a reference signal identification component 915, a noise level tracking component 920, a symbol set transmission component 925, a DMRS component 930, a NTRS component 935, a configuration manager 940, a LBT manager 945, and a symbol set reception component 950. Each of these modules may communicate, directly or indirectly, with one another (e.g., via one or more buses).

The symbol set identification component 910 may identify a first set of symbols within a TTI that have a first expected noise level and a second set of symbols within the TTI that have a second expected noise level, where the second set of symbols is different than the first set of symbols within the TTI and the first expected noise level is different than the second expected noise level.

The reference signal identification component 915 may identify one or more first reference signals configured for the TTI, the one or more first reference signals in at least one symbol of the first set of symbols. In some examples, the reference signal identification component 915 may determine one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols.

In some examples, the reference signal identification component 915 may determine a set of configured symbol locations for transmission of the first reference signal. In some examples, the reference signal identification component 915 may determine that the one or more second reference signals are to be added for transmission in the second set of symbols based on the set of configured symbol locations being non-overlapping with the second set of symbols.

In some cases, a first frequency density of the one or more first reference signals within the first set of symbols is greater than a second frequency density of the one or more second reference signals within the second set of symbols. In some cases, the one or more second reference signals have a same frequency density as the one or more first reference signals. In some cases, a frequency density of the one or more second reference signals is determined based on a data allocation size of the TTI, a modulation and coding scheme for the TTI, or any combination thereof. In some cases, the one or more second reference signals are transmitted via a reduced number of antenna ports relative to the first reference signal.

In some cases, the one or more second reference signals are transmitted using a single antenna port associated with a lowest indexed antenna port of the one or more first reference signals. In some cases, the one or more second reference signals are transmitted using a single antenna port that is quasi-co-located with a set of antenna ports associated with the one or more first reference signals. In some cases, the one or more second reference signals are transmitted using one or more antenna ports, and where each antenna port of the one or more second reference signals is quasi-co-located with one or more antenna ports associated with the one or more first reference signals based on a preconfigured or semi-statically configured mapping between antenna ports of the one or more first reference signals and the one or more second reference signals.

The noise level tracking component 920 may determine one or more symbols in the second set of symbols that are to include one or more second reference signals based on the first expected noise level being different than the second expected noise level.

In some examples, the noise level tracking component 920, when in a receiving UE, may compute a first set of log likelihood ratios (LLRs) for the first set of symbols based on the first noise estimation, and compute a second set of LLRs for the second set of symbols based on the second noise estimation.

In some examples, the noise level tracking component 920 may determine to add the one or more second reference signals to the first set of symbols based on a time-density of the one or more first reference signals within the first set of symbols. In some examples, when in a transmitting UE, the noise level tracking component 920 may transmit the one or more second reference signals in the first set of symbols. In some examples, when in a receiving UE, the noise level tracking component 920 may determine, based on the first reference signal and the second reference signal, one or more of a noise covariance estimation, a channel estimation, or a carrier frequency offset estimation for each of the first set of symbols and the second set of symbols for use in computing the first set of LLRs and the second set of LLRs.

In some cases, the one or more second reference signals are added to the second set of symbols based on the one or more first reference signals being absent from the second set of symbols and the first expected noise level being different than the second expected noise level. In some cases, the one or more second reference signals are added to the second set of symbols based on a spacing between transmissions of the one or more first reference signals. In some cases, the determining to add the one or more second reference signals to the first set of symbols is based on a first instance of the first reference signal occurring after a threshold number of symbols within the first set of symbols, and where at least one of the second reference signals is located before the first instance of the first reference signal.

The symbol set transmission component 925 may transmit the one or more first reference signals in the first set of symbols and the one or more second reference signals in the second set of symbols. The symbol set reception component 950 may receive transmissions during the first set of symbols and the second set of symbols.

The DMRS component 930 may configure one or more DMRSs as the one or more first reference signals, the one or more second reference signals, or combinations thereof. In some cases, the one or more first reference signals include one or more DMRSs transmitted in the first set of symbols. In some cases, the one or more second reference signals are additional instances of the DMRS that are added and transmitted in the second set of symbols. In some cases, the DMRSs are transmitted for a first number of antenna ports, and the NTRSs are transmitted for a second number of antenna ports that is less than the first number of antenna ports.

The NTRS component 935 may configure one or more NTRSs as the one or more second reference signals. In some cases, the one or more NTRSs are transmitted in the second set of symbols. In some cases, the DMRSs are transmitted for a first number of antenna ports, and the NTRSs are transmitted for a second number of antenna ports that is less than the first number of antenna ports.

In some examples, the configuration manager 940, when in a transmitting UE, may transmit an indication that the one or more second reference signals are to be used for demodulating data transmissions in the second set of symbols. The configuration manager 940, when in a receiving UE, may receive configuration information that indicates the first set of symbols and the second set of symbols, and that indicates the first set of symbols has a different expected noise level than the second set of symbols. In some cases, all or a portion of the configuration information is received in RRC signaling. In some cases, the reference signal configuration is based on a preconfigured or semi-statically configured resource pool that includes the TTI.

In some cases, the indication is a flag that indicates transmission of one or more additional reference signals in addition to the one or more first reference signals. In some cases, the indication provides one or more of a symbol location, frequency density, or any combinations thereof, for one or more additional reference signals in addition to the one or more first reference signals. In some cases, the indication provides an index into a preconfigured mapping of reference signal symbol locations and frequency density.

In some cases, the indication is provided via a modulation and coding scheme (MCS) of the TTI, a maximum number of symbols configured for contention-based access to transmission resources of the TTI, a contention-based access sequence provided during an access procedure, a number of aggregated slots included in the TTI, an index into a preconfigured mapping of reference signal symbol locations and frequency density, a cyclic shift used for a reference signal transmitted with control information that carries the indication, or any combinations thereof.

The LBT manager 945 may manage contention-based channel access. In some cases, a resource pool configuration associated with the TTI provides a number of symbols configured for a contention-based access procedure, a number of slots aggregated within the TTI, a location of a feedback symbol within the TTI, or any combinations thereof. In some cases, a contention-based access sequence is received during a symbol associated with a contention-based access procedure.

Figure 10:
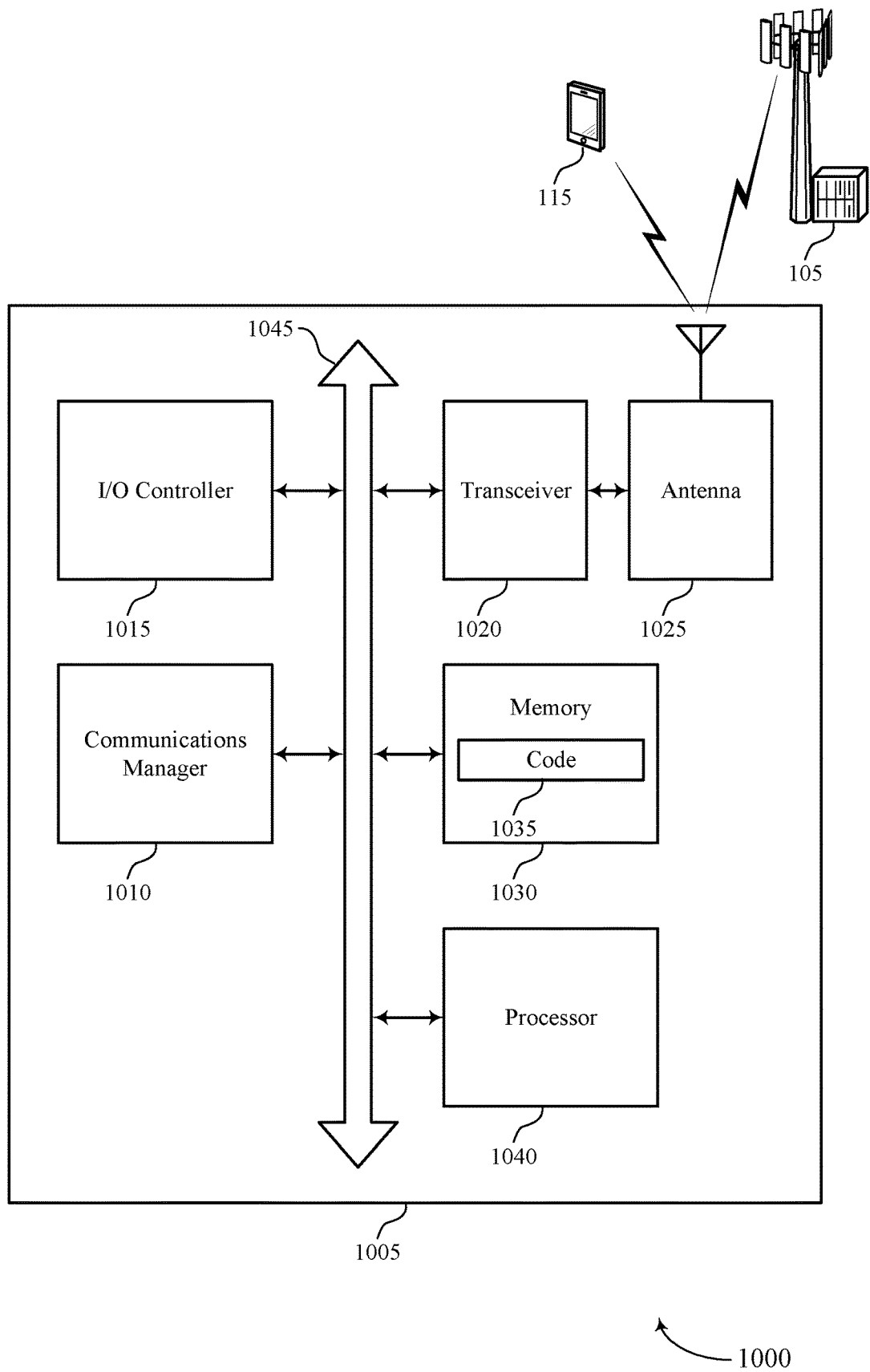
FIG. 10 shows a diagram of a system including a device that supports noise tracking within TTIs in wireless communications in accordance with aspects of the present disclosure.

FIG. 10 shows a diagram of a system 1000 including a device 1005 that supports noise tracking within TTIs in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a first set of symbols within a TTI that have a first expected noise level and a second set of symbols within the TTI that have a second expected noise level, where the second set of symbols is different than the first set of symbols within the TTI and the first expected noise level is different than the second expected noise level, identify one or more first reference signals configured for the TTI, the one or more first reference signals in at least one symbol of the first set of symbols, determine one or more symbols in the second set of symbols that are to include one or more second reference signals based on the first expected noise level being different than the second expected noise level, and transmit the one or more first reference signals in the first set of symbols and the one or more second reference signals in the second set of symbols.

The communications manager 1010 may also identify one or more first reference signals configured for a TTI, the one or more first reference signals in at least one symbol of a first set of symbols within the TTI, determine one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols, receive transmissions during the first set of symbols and the second set of symbols, and compute a first set of log likelihood ratios (LLRs) for the first set of symbols based on the first noise estimation, and computing a second set of LLRs for the second set of symbols based on the second noise estimation.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting noise tracking within TTIs in wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
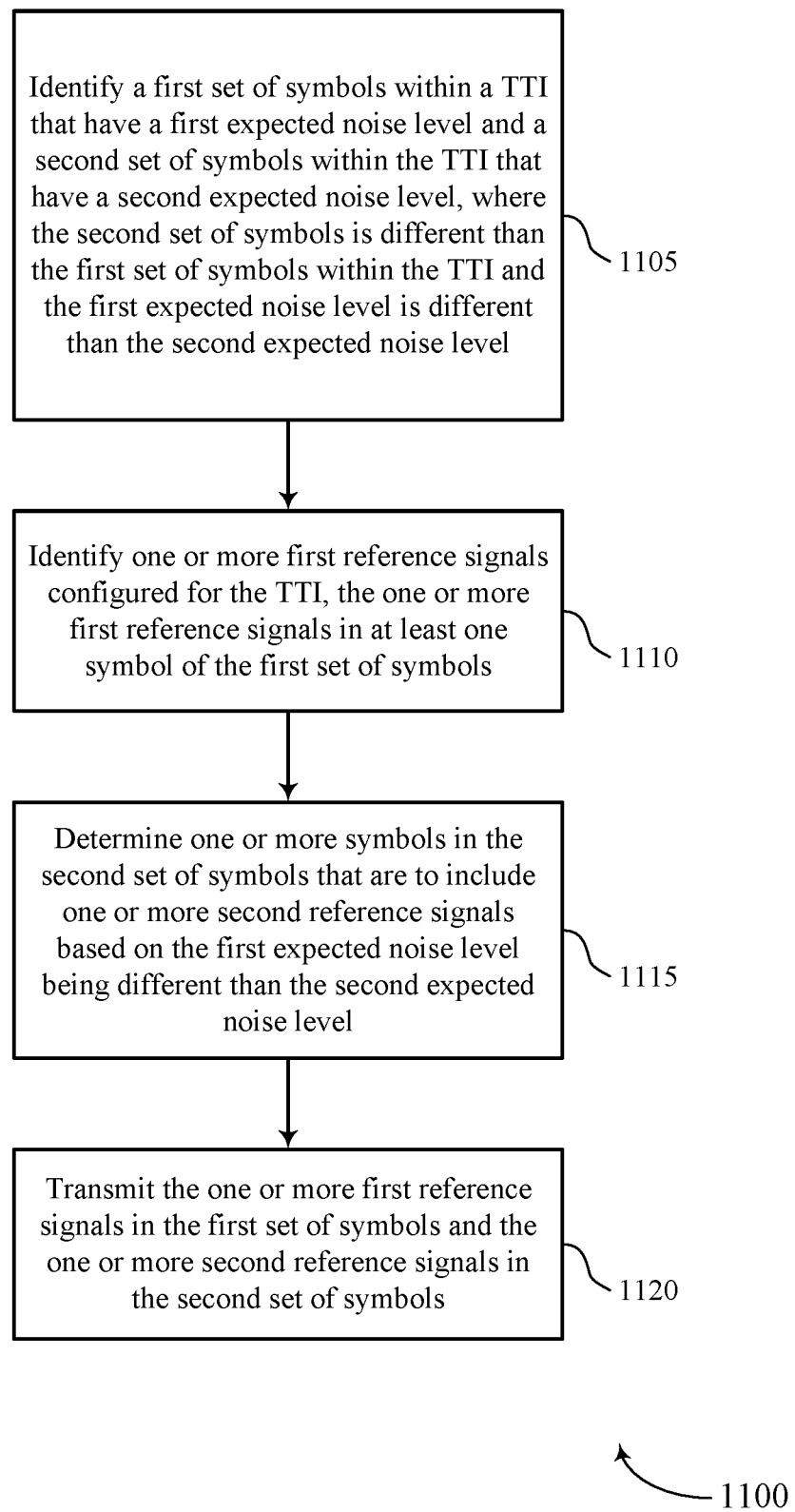
FIGS. 11 through 16 show flowcharts illustrating methods that support noise tracking within TTIs in wireless communications in accordance with aspects of the present disclosure.

FIG. 11 shows a flowchart illustrating a method 1100 that supports noise tracking within TTIs in wireless communications in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may identify a first set of symbols within a TTI that have a first expected noise level and a second set of symbols within the TTI that have a second expected noise level, where the second set of symbols is different than the first set of symbols within the TTI and the first expected noise level is different than the second expected noise level. The operations of 1105 may be performed according to the methods described herein. In some examples, aspects of the operations of 1105 may be performed by a symbol set identification component as described with reference to FIGS. 7 through 10.

At 1110, the UE may identify one or more first reference signals configured for the TTI, the one or more first reference signals in at least one symbol of the first set of symbols. The operations of 1110 may be performed according to the methods described herein. In some examples, aspects of the operations of 1110 may be performed by a reference signal identification component as described with reference to FIGS. 7 through 10.

At 1115, the UE may determine one or more symbols in the second set of symbols that are to include one or more second reference signals based on the first expected noise level being different than the second expected noise level. The operations of 1115 may be performed according to the methods described herein. In some examples, aspects of the operations of 1115 may be performed by a noise level tracking component as described with reference to FIGS. 7 through 10.

At 1120, the UE may transmit the one or more first reference signals in the first set of symbols and the one or more second reference signals in the second set of symbols. The operations of 1120 may be performed according to the methods described herein. In some examples, aspects of the operations of 1120 may be performed by a symbol set transmission component as described with reference to FIGS. 7 through 10.

Figure 12:
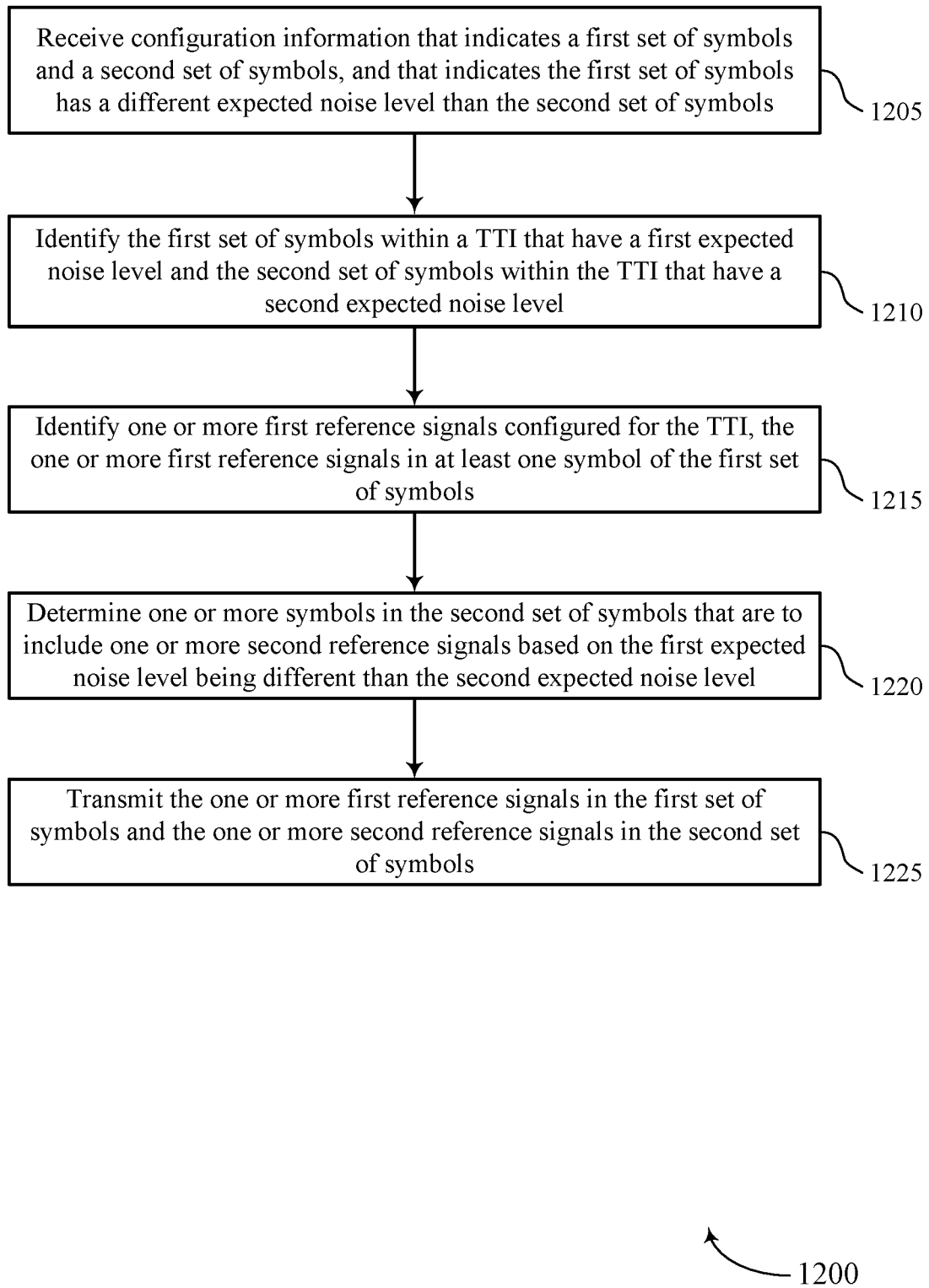

FIG. 12 shows a flowchart illustrating a method 1200 that supports noise tracking within TTIs in wireless communications in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive configuration information that indicates a first set of symbols and a second set of symbols, and that indicates the first set of symbols has a different expected noise level than the second set of symbols. The operations of 1205 may be performed according to the methods described herein. In some examples, aspects of the operations of 1205 may be performed by a configuration manager as described with reference to FIGS. 7 through 10.

At 1210, the UE may identify, based on the configuration information, the first set of symbols within a TTI that have a first expected noise level and the second set of symbols within the TTI that have a second expected noise level. The operations of 1210 may be performed according to the methods described herein. In some examples, aspects of the operations of 1210 may be performed by a symbol set identification component as described with reference to FIGS. 7 through 10.

At 1215, the UE may identify one or more first reference signals configured for the TTI, the one or more first reference signals in at least one symbol of the first set of symbols. The operations of 1215 may be performed according to the methods described herein. In some examples, aspects of the operations of 1215 may be performed by a reference signal identification component as described with reference to FIGS. 7 through 10.

At 1220, the UE may determine one or more symbols in the second set of symbols that are to include one or more second reference signals based on the first expected noise level being different than the second expected noise level. The operations of 1220 may be performed according to the methods described herein. In some examples, aspects of the operations of 1220 may be performed by a noise level tracking component as described with reference to FIGS. 7 through 10.

At 1225, the UE may transmit the one or more first reference signals in the first set of symbols and the one or more second reference signals in the second set of symbols. The operations of 1225 may be performed according to the methods described herein. In some examples, aspects of the operations of 1225 may be performed by a symbol set transmission component as described with reference to FIGS. 7 through 10.

Figure 13:
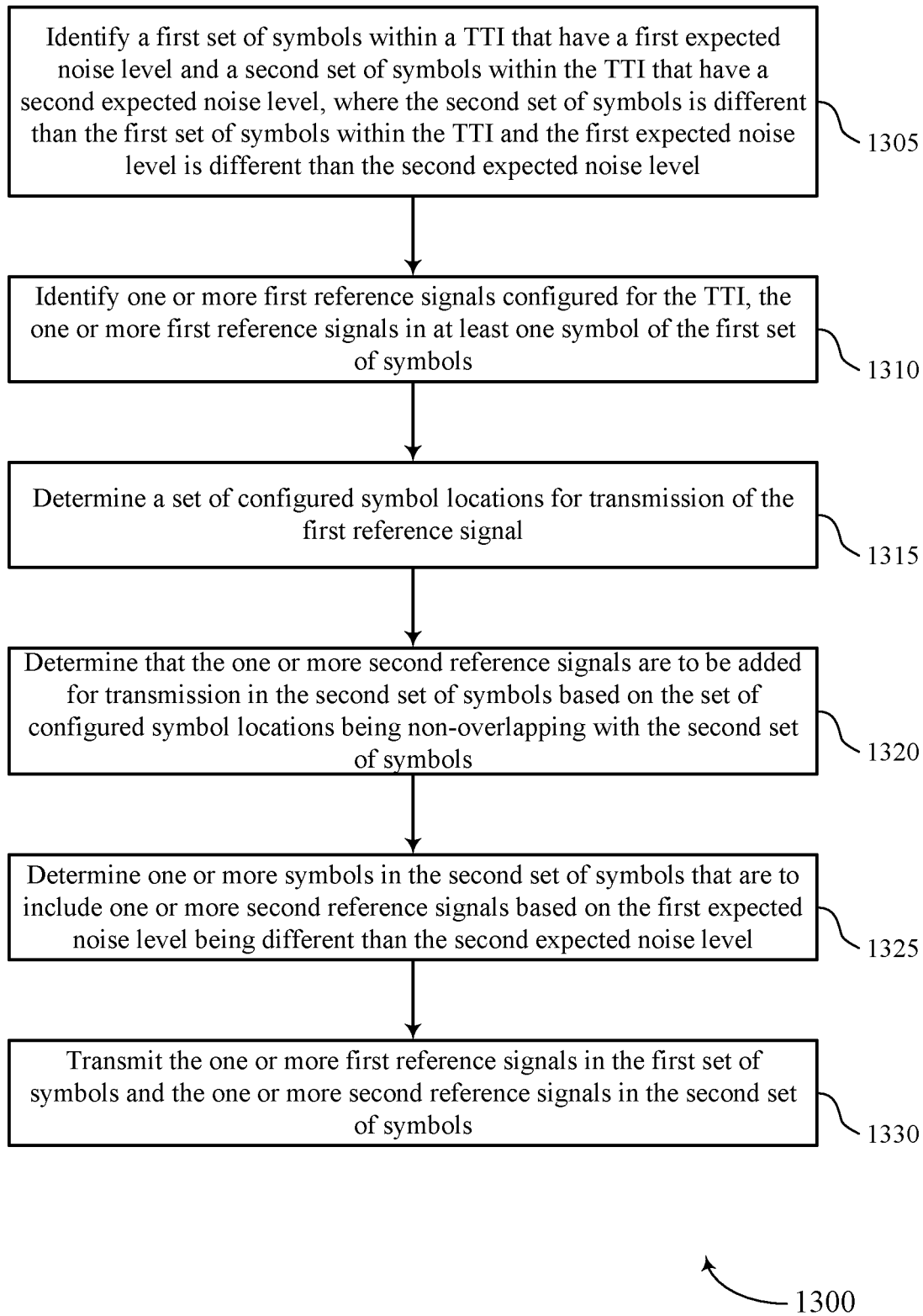

FIG. 13 shows a flowchart illustrating a method 1300 that supports noise tracking within TTIs in wireless communications in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may identify a first set of symbols within a TTI that have a first expected noise level and a second set of symbols within the TTI that have a second expected noise level, where the second set of symbols is different than the first set of symbols within the TTI and the first expected noise level is different than the second expected noise level. The operations of 1305 may be performed according to the methods described herein. In some examples, aspects of the operations of 1305 may be performed by a symbol set identification component as described with reference to FIGS. 7 through 10.

At 1310, the UE may identify one or more first reference signals configured for the TTI, the one or more first reference signals in at least one symbol of the first set of symbols. The operations of 1310 may be performed according to the methods described herein. In some examples, aspects of the operations of 1310 may be performed by a reference signal identification component as described with reference to FIGS. 7 through 10.

At 1315, the UE may determine a set of configured symbol locations for transmission of the first reference signal. The operations of 1315 may be performed according to the methods described herein. In some examples, aspects of the operations of 1315 may be performed by a reference signal identification component as described with reference to FIGS. 7 through 10.

At 1320, the UE may determine that the one or more second reference signals are to be added for transmission in the second set of symbols based on the set of configured symbol locations being non-overlapping with the second set of symbols. The operations of 1320 may be performed according to the methods described herein. In some examples, aspects of the operations of 1320 may be performed by a reference signal identification component as described with reference to FIGS. 7 through 10.

At 1325, the UE may determine one or more symbols in the second set of symbols that are to include one or more second reference signals based on the first expected noise level being different than the second expected noise level. The operations of 1325 may be performed according to the methods described herein. In some examples, aspects of the operations of 1325 may be performed by a noise level tracking component as described with reference to FIGS. 7 through 10.

At 1330, the UE may transmit the one or more first reference signals in the first set of symbols and the one or more second reference signals in the second set of symbols.

The operations of 1330 may be performed according to the methods described herein. In some examples, aspects of the operations of 1330 may be performed by a symbol set transmission component as described with reference to FIGS. 7 through 10.

Figure 14:
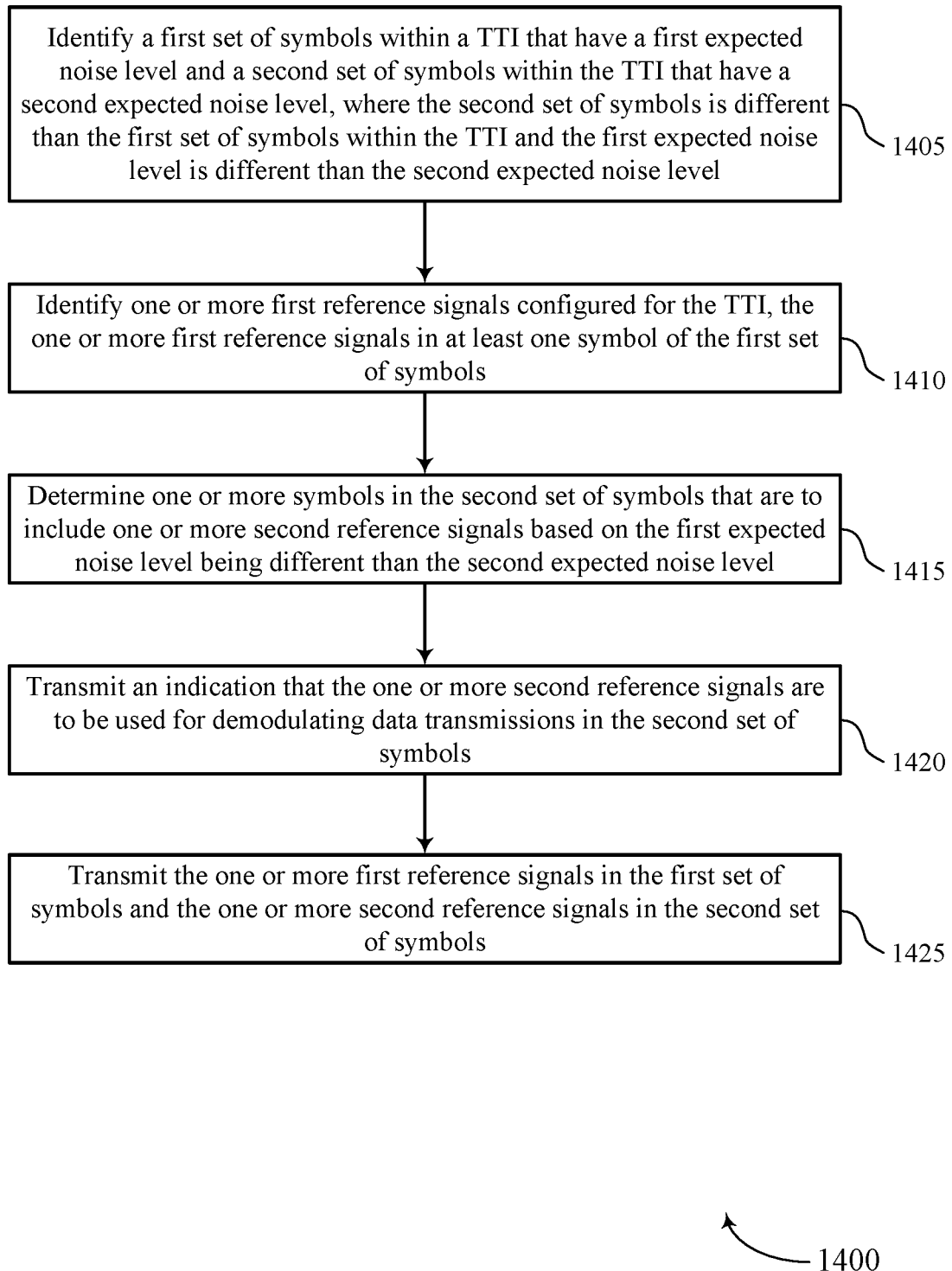

FIG. 14 shows a flowchart illustrating a method 1400 that supports noise tracking within TTIs in wireless communications in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may identify a first set of symbols within a TTI that have a first expected noise level and a second set of symbols within the TTI that have a second expected noise level, where the second set of symbols is different than the first set of symbols within the TTI and the first expected noise level is different than the second expected noise level. The operations of 1405 may be performed according to the methods described herein. In some examples, aspects of the operations of 1405 may be performed by a symbol set identification component as described with reference to FIGS. 7 through 10.

At 1410, the UE may identify one or more first reference signals configured for the TTI, the one or more first reference signals in at least one symbol of the first set of symbols. The operations of 1410 may be performed according to the methods described herein. In some examples, aspects of the operations of 1410 may be performed by a reference signal identification component as described with reference to FIGS. 7 through 10.

At 1415, the UE may determine one or more symbols in the second set of symbols that are to include one or more second reference signals based on the first expected noise level being different than the second expected noise level. The operations of 1415 may be performed according to the methods described herein. In some examples, aspects of the operations of 1415 may be performed by a noise level tracking component as described with reference to FIGS. 7 through 10.

At 1420, the UE may transmit an indication that the one or more second reference signals are to be used for demodulating data transmissions in the second set of symbols. The operations of 1420 may be performed according to the methods described herein. In some examples, aspects of the operations of 1420 may be performed by a configuration manager as described with reference to FIGS. 7 through 10. In some cases, the UE may transmit a flag that indicates transmission of one or more additional reference signals in addition to the one or more first reference signals. In some cases, the UE may transmit an indication that provides one or more of a symbol location, frequency density, or any combinations thereof, for one or more additional reference signals in addition to the one or more first reference signals. In some cases, the UE may transmit an index into a preconfigured mapping of reference signal symbol locations and frequency density. In some cases, the indication is provided via a modulation and coding scheme (MCS) of the TTI, a maximum number of symbols configured for contention-based access to transmission resources of the TTI, a contention-based access sequence provided during an access procedure, a number of aggregated slots included in the TTI, a cyclic shift used for a reference signal transmitted with control information that carries the indication, or any combinations thereof.

At 1425, the UE may transmit the one or more first reference signals in the first set of symbols and the one or more second reference signals in the second set of symbols. The operations of 1425 may be performed according to the methods described herein. In some examples, aspects of the operations of 1425 may be performed by a symbol set transmission component as described with reference to FIGS. 7 through 10.

Figure 15:
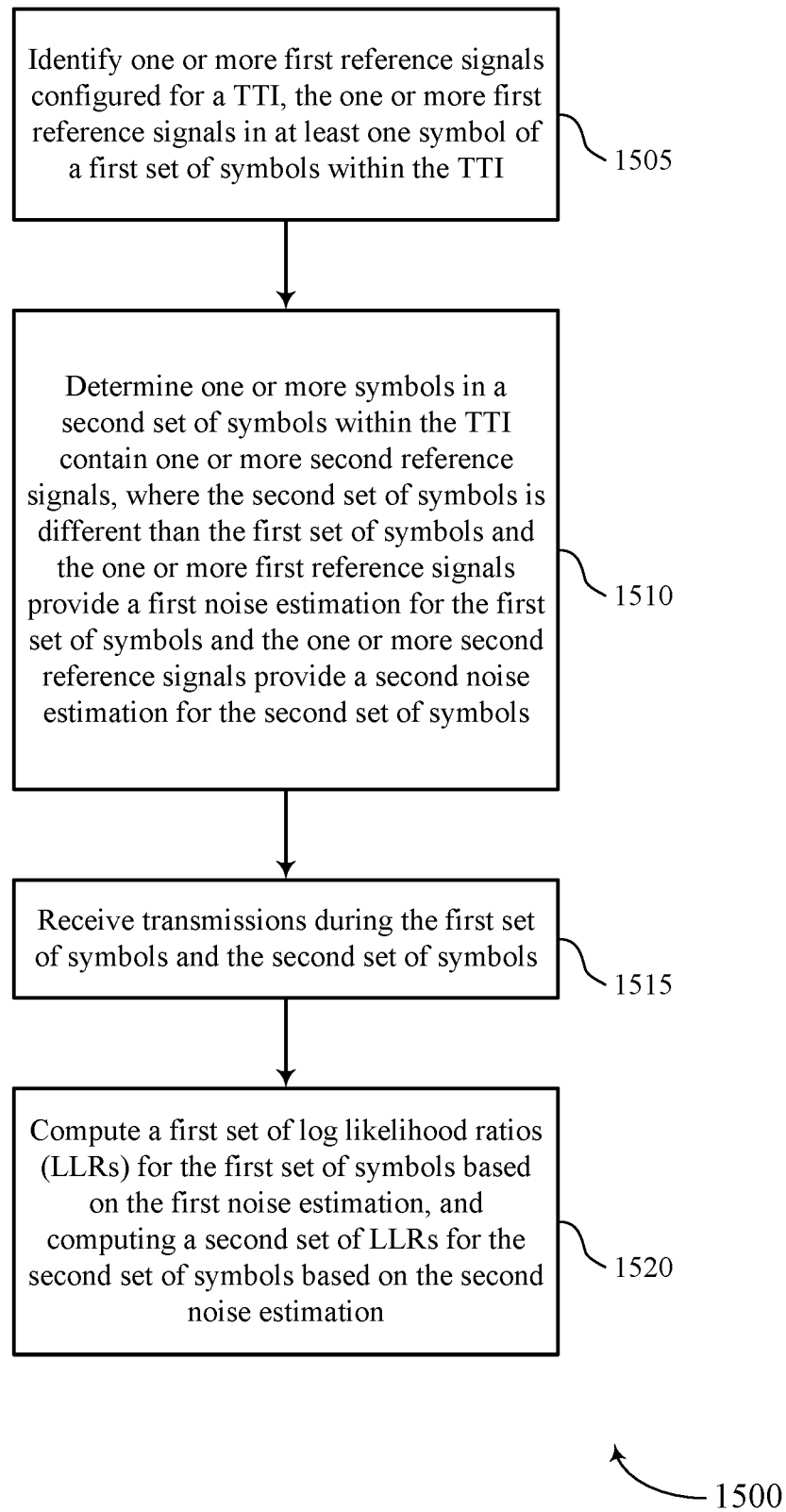

FIG. 15 shows a flowchart illustrating a method 1500 that supports noise tracking within TTIs in wireless communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify one or more first reference signals configured for a TTI, the one or more first reference signals in at least one symbol of a first set of symbols within the TTI. The operations of 1505 may be performed according to the methods described herein. In some examples, aspects of the operations of 1505 may be performed by a reference signal identification component as described with reference to FIGS. 7 through 10.

At 1510, the UE may determine one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols. The operations of 1510 may be performed according to the methods described herein. In some examples, aspects of the operations of 1510 may be performed by a reference signal identification component as described with reference to FIGS. 7 through 10.

At 1515, the UE may receive transmissions during the first set of symbols and the second set of symbols. The operations of 1515 may be performed according to the methods described herein. In some examples, aspects of the operations of 1515 may be performed by a symbol set reception component as described with reference to FIGS. 7 through 10.

At 1520, the UE may compute a first set of log likelihood ratios (LLRs) for the first set of symbols based on the first noise estimation, and computing a second set of LLRs for the second set of symbols based on the second noise estimation. The operations of 1520 may be performed according to the methods described herein. In some examples, aspects of the operations of 1520 may be performed by a noise level tracking component as described with reference to FIGS. 7 through 10.

Figure 16:
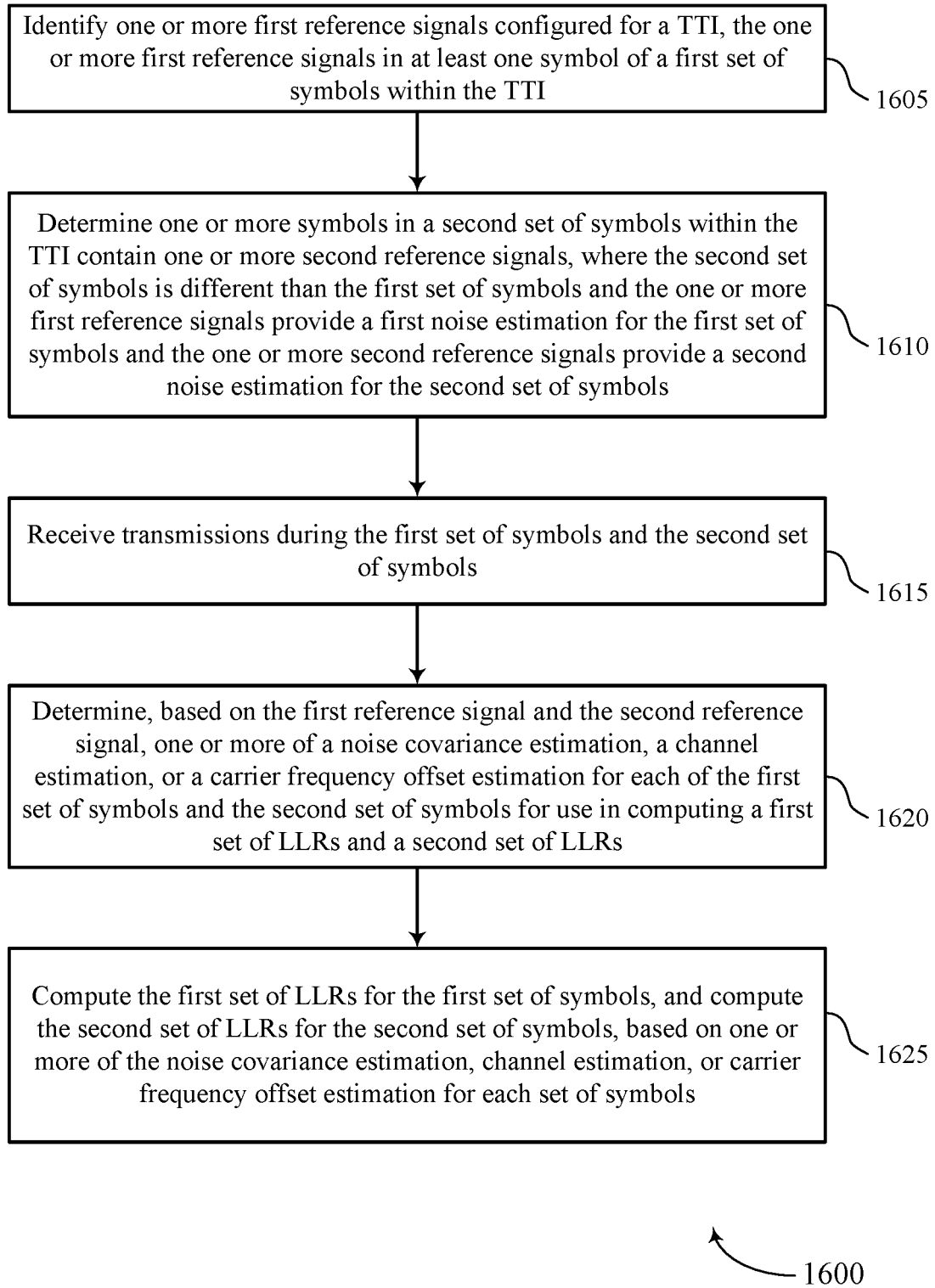

FIG. 16 shows a flowchart illustrating a method 1600 that supports noise tracking within TTIs in wireless communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may identify one or more first reference signals configured for a TTI, the one or more first reference signals in at least one symbol of a first set of symbols within the TTI. The operations of 1605 may be performed according to the methods described herein. In some examples, aspects of the operations of 1605 may be performed by a reference signal identification component as described with reference to FIGS. 7 through 10.

At 1610, the UE may determine one or more symbols in a second set of symbols within the TTI contain one or more second reference signals, where the second set of symbols is different than the first set of symbols and the one or more first reference signals provide a first noise estimation for the first set of symbols and the one or more second reference signals provide a second noise estimation for the second set of symbols. The operations of 1610 may be performed according to the methods described herein. In some examples, aspects of the operations of 1610 may be performed by a reference signal identification component as described with reference to FIGS. 7 through 10.

At 1615, the UE may receive transmissions during the first set of symbols and the second set of symbols. The operations of 1615 may be performed according to the methods described herein. In some examples, aspects of the operations of 1615 may be performed by a symbol set reception component as described with reference to FIGS. 7 through 10.

At 1620, the UE may determine, based on the first reference signal and the second reference signal, one or more of a noise covariance estimation, a channel estimation, or a carrier frequency offset estimation for each of the first set of symbols and the second set of symbols for use in computing a first set of LLRs and a second set of LLRs. The operations of 1620 may be performed according to the methods described herein. In some examples, aspects of the operations of 1620 may be performed by a noise level tracking component as described with reference to FIGS. 7 through 10.

At 1625, the UE may compute the first set of LLRs for the first set of symbols and compute the second set of LLRs for the second set of symbols based on one or more of the noise covariance estimation, channel estimation, or carrier frequency offset estimation for each set of symbols. The operations of 1625 may be performed according to the methods described herein. In some examples, aspects of the operations of 1625 may be performed by a noise level tracking component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Various examples provide methods and apparatuses for noise tracking as described herein, and a non-exhaustive list of examples is provided below. Example 1 is a method for wireless communication that includes identifying a first set of symbols within a transmission time interval (TTI) that have a first expected noise level and a second set of symbols within the TTI that have a second expected noise level, wherein the second set of symbols is different than the first set of symbols within the TTI and the first expected noise level is different than the second expected noise level, identifying one or more first reference signals configured for the TTI, the one or more first reference signals in at least one symbol of the first set of symbols, determining one or more symbols in the second set of symbols that are to include one or more second reference signals based at least in part on the first expected noise level being different than the second expected noise level, and transmitting the one or more first reference signals in the first set of symbols and the one or more second reference signals in the second set of symbols.

In example 2, the one or more second reference signals of example 1 are added to the second set of symbols based at least in part on the one or more first reference signals being absent from the second set of symbols and the first expected noise level being different than the second expected noise level. In example 3 the one or more second reference signals of any of examples 1-2 are added to the second set of symbols based at least in part on a spacing between transmissions of the one or more first reference signals. In example 4, in any of examples 1-3 the one or more first reference signals are demodulation reference signals (DMRSs) transmitted in the first set of symbols, and the one or more second reference signals are additional instances of the DMRS that are added and transmitted in the second set of symbols.

In example 5, in any of examples 1-4 the one or more first reference signals are demodulation reference signals (DMRSs) transmitted in the first set of symbols, and the one or more second reference signals are noise tracking reference signals (NTRSs) transmitted in the second set of symbols. In example 6, in any of examples 1-5 the DMRSs are transmitted for a first number of antenna ports, and the NTRSs are transmitted for a second number of antenna ports that is less than the first number of antenna ports. In example 7, in any of examples 1-6 a first frequency density of the one or more first reference signals within the first set of symbols is greater than a second frequency density of the one or more second reference signals within the second set of symbols.

In example 8, the method of any of examples 1-7 further include receiving configuration information that indicates the first set of symbols and the second set of symbols, and that indicates the first set of symbols has a different expected noise level than the second set of symbols. In example 9, configuration information of any of examples 1-8 is received in radio resource control (RRC) signaling.

In example 10, in any of examples 1-9, the identifying is based at least in part on a preconfigured or semi-statically configured resource pool that includes the TTI. In example 11, in any of examples 1-10, the TTI includes contention-based resources, and wherein the identifying is based at least in part on a number of symbols within the TTI associated with a contention-based access procedure for initiating transmissions within the TTI.

In example 12, in any of examples 1-11, the determining may include determining a plurality of configured symbol locations for transmission of the first reference signal, and determining that the one or more second reference signals are to be added for transmission in the second set of symbols based at least in part on the plurality of configured symbol locations being non-overlapping with the second set of symbols.

In example 13, the method of any of examples 1-12 may also include determining to add the one or more second reference signals to the first set of symbols based at least in part on a time-density of the one or more first reference signals within the first set of symbols, and transmitting the one or more second reference signals in the first set of symbols.

In example 14, in any of examples 1-13, the determining to add the one or more second reference signals to the first set of symbols is based at least in part on a first instance of the first reference signal occurring after a threshold number of symbols within the first set of symbols, and wherein at least one of the second reference signals is located before the first instance of the first reference signal.

In example 15, in any of examples 1-14, the one or more second reference signals have a same frequency density as the one or more first reference signals. In example 16, in any of examples 1-15, a frequency density of the one or more second reference signals is determined based at least in part on a data allocation size of the TTI, a modulation and coding scheme for the TTI, or any combination thereof. In example 17, in any of examples 1-16, the one or more second reference signals are transmitted via a reduced number of antenna ports relative to the first reference signal. In example 18, in any of examples 1-17, the one or more second reference signals are transmitted using a single antenna port associated with a lowest indexed antenna port of the one or more first reference signals. In example 19, in any of examples 1-18, the one or more second reference signals are transmitted using a single antenna port that is quasi-co-located with a plurality of antenna ports associated with the one or more first reference signals. In example 20, in any of examples 1-19, the one or more second reference signals are transmitted using one or more antenna ports, and wherein each antenna port of the one or more second reference signals is quasi-co-located with one or more antenna ports associated with the one or more first reference signals based on a preconfigured or semi-statically configured mapping between antenna ports of the one or more first reference signals and the one or more second reference signals.

In example 21, the method of any of examples 1-20 may also include transmitting an indication that the one or more second reference signals are to be used for demodulating data transmissions in the second set of symbols. In example 22, in any of examples 1-21, the indication is a flag that indicates transmission of one or more additional reference signals in addition to the one or more first reference signals. In example 23, in any of examples 1-22, the indication provides one or more of a symbol location, frequency density, or any combinations thereof, for one or more additional reference signals in addition to the one or more first reference signals. In example 24, in any of examples 1-23, the indication provides an index into a preconfigured mapping of reference signal symbol locations and frequency density. In example 25, in any of examples 1-24, the indication is provided via a modulation and coding scheme (MCS) of the TTI, a maximum number of symbols configured for contention-based access to transmission resources of the TTI, a contention-based access sequence provided during an access procedure, a number of aggregated slots included in the TTI, an index into a preconfigured mapping of reference signal symbol locations and frequency density, a cyclic shift used for a reference signal transmitted with control information that carries the indication, or any combinations thereof.

In example 26 a method for wireless communication includes identifying one or more first reference signals configured for a transmission time interval (TTI), the one or more first reference signals in at least one symbol of a first set of symbols within the TTI, determining one or more symbols in a second set of symbols within the TTI contain one or more second reference signals, wherein the second set of symbols is different than the first set of symbols and the one or more first reference signals provide a first noise estimation for the first set of symbols and the one or more second reference signals provide a second noise estimation for the second set of symbols, receiving transmissions during the first set of symbols and the second set of symbols, and computing a first plurality of log likelihood ratios (LLRs) for the first set of symbols based at least in part on the first noise estimation, and computing a second plurality of LLRs for the second set of symbols based at least in part on the second noise estimation.

In example 27, in example 26, the one or more second reference signals are added to the second set of symbols based at least in part on the one or more first reference signals being absent from the second set of symbols and a first expected noise level of the first set of symbols being different than a second expected noise level of the second set of symbols. In example 28, in any of examples 26-27, the one or more second reference signals are added to the second set of symbols based at least in part on a spacing between transmissions of the one or more first reference signals. In example 29, in any of examples 26-28, the determining is based at least in part on one or more of control information received during the TTI, a resource pool configuration associated with the TTI, a transmission sequence received during the TTI, or any combinations thereof. In example 30, in any of examples 26-29, the control information comprises an indication provided via a modulation and coding scheme (MCS) of the TTI, a maximum number of symbols configured for a contention-based access to transmission resources of the TTI, a number of aggregated slots included in the TTI, an index into a preconfigured mapping of reference signal symbol locations and frequency density, or combinations thereof. In example 31, in any of examples 26-30, the resource pool configuration associated with the TTI comprises a number of symbols configured for a contention-based access procedure, a number of slots aggregated within the TTI, a location of a feedback symbol within the TTI, or any combinations thereof.

In example 32, in any of examples 26-31, transmission sequence received during the TTI comprises a contention-based access sequence received during a symbol associated with a contention-based access procedure, a cyclic shift used for a reference signal transmitted with control information, or any combinations thereof. In example 33, the method of any of examples 26-32 also includes determining, based at least in part on the first reference signal and the second reference signal, one or more of a noise covariance estimation, a channel estimation, or a carrier frequency offset estimation for each of the first set of symbols and the second set of symbols for use in computing the first plurality of LLRs and the second plurality of LLRs.

In example 34, in any of examples 26-33, the one or more first reference signals are demodulation reference signals (DMRSs) transmitted in the first set of symbols, and the one or more second reference signals are additional instances of the DMRS that are added and transmitted in the second set of symbols. In example 35, in any of examples 26-34, the one or more first reference signals are demodulation reference signal (DMRSs) transmitted in the first set of symbols, and the one or more second reference signals are noise tracking reference signals (NTRSs) transmitted in the second set of symbols. In example 36, in any of examples 26-35, the DMRSs are transmitted for a first number of antenna ports, and the NTRSs are transmitted for a second number of antenna ports that is less than the first number of antenna ports.

In example 37, the method of any of examples 26-36 may also include receiving configuration information that indicates the first set of symbols and the second set of symbols, and that indicates the first set of symbols has a different expected noise level than the second set of symbols, and wherein the determining is based at least in part on the configuration information. In example 38, in any of examples 26-37, the configuration information is received in radio resource control (RRC) signaling. In example 39, in any of examples 26-38, the determining includes determining that a plurality of configured symbol locations for transmission of the one or more first reference signals, and determining that the one or more second reference signals are to be added and transmitted in the second set of symbols based at least in part on the plurality of configured symbol locations being non-overlapping with the second set of symbols.

In example 40, in any of examples 26-39, the one or more second reference signals have a same frequency density as the one or more first reference signals. In example 41, in any of examples 26-40, the one or more second reference signals have a reduced frequency density relative to the one or more first reference signals. In example 42, in any of examples 26-41, the one or more second reference signals are transmitted via a reduced number of antenna ports relative to the one or more first reference signals. In example 43, in any of examples 26-42, the one or more second reference signals are transmitted using a single antenna port associated with a lowest indexed antenna port of the one or more first reference signals. In example 44, in any of examples 26-43, the one or more second reference signals are transmitted using a single antenna port that is quasi-co-located with a plurality of antenna ports associated with the one or more first reference signals In example 45, in any of examples 26-44, the one or more second reference signals are transmitted using one or more antenna ports, and wherein each antenna port of the one or more second reference signals is quasi-co-located with one or more antenna ports associated with the one or more first reference signals based on a preconfigured or semi-statically configured mapping between antenna ports of the one or more first reference signals and the one or more second reference signals. In example 46, the method of any of examples 26-45, may further include receiving control information that includes an indication the one or more second reference signals are transmitted in addition to the one or more first reference signals, and wherein the determining is based at least in part on the indication. In example 47, in any of examples 26-46, the indication is a flag that indicates one or more additional reference signals are transmitted in addition to the one or more first reference signals. In example 48, in any of examples 26-47, the indication provides one or more of a symbol location, frequency density, or any combinations thereof, for one or more additional reference signals in addition to the one or more first reference signals. In example 49, in any of examples 26-48, the indication provides an index into a preconfigured mapping of reference signal symbol locations and frequency density.

Example 50 is a system or apparatus including means for implementing a method or realizing an apparatus as in any of examples 1-49. Example 51 is a non-transitory computer-readable medium storing instructions executable by one or more processors to cause the one or more processors to implement a method as in any of examples 1-49. Example 52 is a system including one or more processors and memory in electronic communication with the one or more processors storing instructions executable by the one or more processors to cause the system or apparatus to implement a method as in any of examples 1-49.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first set of symbols within a transmission time interval (TTI) that have a first expected noise level and a second set of symbols within the TTI that have a second expected noise level, wherein the second set of symbols is different than the first set of symbols within the TTI and the first expected noise level is different than the second expected noise level;
   identifying one or more first reference signals configured for the TTI, the one or more first reference signals in at least one symbol of the first set of symbols;
   determining one or more symbols in the second set of symbols that are to include one or more second reference signals based at least in part on the first expected noise level being different than the second expected noise level; and
   transmitting the one or more first reference signals in the first set of symbols and the one or more second reference signals in the second set of symbols.

2. The method of claim 1, wherein the one or more second reference signals are added to the second set of symbols based at least in part on the one or more first reference signals being absent from the second set of symbols and the first expected noise level being different than the second expected noise level.

3. The method of claim 1, wherein the one or more second reference signals are added to the second set of symbols based at least in part on a spacing between transmissions of the one or more first reference signals.

4. The method of claim 1, wherein:
   the one or more first reference signals are demodulation reference signals (DMRSs) transmitted in the first set of symbols; and
   the one or more second reference signals are additional instances of the DMRS that are added and transmitted in the second set of symbols.

5. The method of claim 1, wherein:
   the one or more first reference signals are demodulation reference signals (DMRSs) transmitted in the first set of symbols; and
   the one or more second reference signals are noise tracking reference signals (NTRSs) transmitted in the second set of symbols.

6. The method of claim 5, wherein the DMRSs are transmitted for a first number of antenna ports, and the NTRSs are transmitted for a second number of antenna ports that is less than the first number of antenna ports.

7. The method of claim 1, wherein a first frequency density of the one or more first reference signals within the first set of symbols is greater than a second frequency density of the one or more second reference signals within the second set of symbols.

8. The method of claim 1, further comprising:
   receiving configuration information that indicates the first set of symbols and the second set of symbols, and that indicates the first set of symbols has a different expected noise level than the second set of symbols.

9. The method of claim 1, wherein the identifying is based at least in part on a preconfigured or semi-statically configured resource pool that includes the TTI, and wherein the TTI includes contention-based resources, and wherein the identifying is based at least in part on a number of symbols within the TTI associated with a contention-based access procedure for initiating transmissions within the TTI.

10. The method of claim 1, wherein the determining comprises:
    determining a plurality of configured symbol locations for transmission of the first reference signal; and
    determining that the one or more second reference signals are to be added for transmission in the second set of symbols based at least in part on the plurality of configured symbol locations being non-overlapping with the second set of symbols.

11. The method of claim 1, further comprising:
    determining to add the one or more second reference signals to the first set of symbols based at least in part on a time-density or location of the one or more first reference signals within the first set of symbols; and
    transmitting the one or more second reference signals in the first set of symbols.

12. The method of claim 1, wherein the one or more second reference signals have a same frequency density as the one or more first reference signals.

13. The method of claim 1, wherein a frequency density of the one or more second reference signals is determined based at least in part on a data allocation size of the TTI, a modulation and coding scheme for the TTI, or any combination thereof.

14. The method of claim 1, wherein the one or more second reference signals are transmitted via a reduced number of antenna ports relative to the first reference signal, and wherein the reduced number of antenna ports include one of:
 a single antenna port associated with a lowest indexed antenna port of the one or more first reference signals,
 a single antenna port that is quasi-co-located with a plurality of antenna ports associated with the one or more first reference signals, or
 one or more antenna ports that are each quasi-co-located with a corresponding antenna port associated with the one or more first reference signals based on a preconfigured or semi-statically configured mapping between antenna ports of the one or more first reference signals and the one or more second reference signals.

15. The method of claim 1, further comprising:
 transmitting an indication that the one or more second reference signals are to be used for demodulating data transmissions in the second set of symbols, and wherein the indication comprises one or more of:
 a flag that indicates transmission of one or more additional reference signals in addition to the one or more first reference signals,
 a symbol location, frequency density, or any combinations thereof, for one or more additional reference signals in addition to the one or more first reference signals, or
 an index into a preconfigured mapping of reference signal symbol locations and frequency density.

16. The method of claim 15, wherein the indication is provided via a modulation and coding scheme (MCS) of the TTI, a maximum number of symbols configured for contention-based access to transmission resources of the TTI, a contention-based access sequence provided during an access procedure, a number of aggregated slots included in the TTI, an index into a preconfigured mapping of reference signal symbol locations and frequency density, a cyclic shift used for a reference signal transmitted with control information that carries the indication, or any combinations thereof.

17. A method for wireless communication, comprising:
 identifying one or more first reference signals configured for a transmission time interval (TTI), the one or more first reference signals in at least one symbol of a first set of symbols within the TTI;
 determining one or more symbols in a second set of symbols within the TTI contain one or more second reference signals, wherein the second set of symbols is different than the first set of symbols and the one or more first reference signals provide a first noise estimation for the first set of symbols and the one or more second reference signals provide a second noise estimation for the second set of symbols;
 receiving transmissions during the first set of symbols and the second set of symbols; and
 computing a first plurality of log likelihood ratios (LLRs) for the first set of symbols based at least in part on the first noise estimation, and computing a second plurality of LLRs for the second set of symbols based at least in part on the second noise estimation.

18. The method of claim 17, wherein the one or more second reference signals are added to the second set of symbols based at least in part on the one or more first reference signals being absent from the second set of symbols and a first expected noise level of the first set of symbols being different than a second expected noise level of the second set of symbols.

19. The method of claim 17, wherein the one or more second reference signals are added to the second set of symbols based at least in part on a spacing between transmissions of the one or more first reference signals.

20. The method of claim 17, wherein the determining is based at least in part on one or more of control information received during the TTI, a resource pool configuration associated with the TTI, a transmission sequence received during the TTI, or any combinations thereof.

21. The method of claim 17, further comprising:
 determining, based at least in part on the first reference signal and the second reference signal, one or more of a noise covariance estimation, a channel estimation, or a carrier frequency offset estimation for each of the first set of symbols and the second set of symbols for use in computing the first plurality of LLRs and the second plurality of LLRs.

22. The method of claim 17, wherein:
 the one or more first reference signals are demodulation reference signals (DMRSs) transmitted in the first set of symbols; and
 the one or more second reference signals are additional instances of the DMRS that are added and transmitted in the second set of symbols.

23. The method of claim 17, wherein:
 the one or more first reference signals are demodulation reference signal (DMRSs) transmitted in the first set of symbols; and
 the one or more second reference signals are noise tracking reference signals (NTRSs) transmitted in the second set of symbols.

24. An apparatus for wireless communication, comprising:
 a processor,
 memory in electronic communication with the processor; and
 instructions stored in the memory and executable by the processor to cause the apparatus to:
 identify a first set of symbols within a transmission time interval (TTI) that have a first expected noise level and a second set of symbols within the TTI that have a second expected noise level, wherein the second set of symbols is different than the first set of symbols within the TTI and the first expected noise level is different than the second expected noise level;
 identify one or more first reference signals configured for the TTI, the one or more first reference signals in at least one symbol of the first set of symbols;
 determine one or more symbols in the second set of symbols that are to include one or more second reference signals based at least in part on the first expected noise level being different than the second expected noise level; and
 transmit the one or more first reference signals in the first set of symbols and the one or more second reference signals in the second set of symbols.

25. The apparatus of claim 24, wherein the one or more second reference signals are added to the second set of symbols based at least in part on the one or more first reference signals being absent from the second set of symbols and the first expected noise level being different than the second expected noise level.

26. The apparatus of claim 24, wherein the one or more second reference signals are added to the second set of symbols based at least in part on a spacing between transmissions of the one or more first reference signals.

27. The apparatus of claim 24, wherein:
the one or more first reference signals are demodulation reference signals (DMRSs) transmitted in the first set of symbols; and
the one or more second reference signals are noise tracking reference signals (NTRSs) transmitted in the second set of symbols.

28. An apparatus for wireless communication, comprising:
a processor,
memory in electronic communication with the processor; and
instructions stored in the memory and executable by the processor to cause the apparatus to:
identify one or more first reference signals configured for a transmission time interval (TTI), the one or more first reference signals in at least one symbol of a first set of symbols within the TTI;
determine one or more symbols in a second set of symbols within the TTI contain one or more second reference signals, wherein the second set of symbols is different than the first set of symbols and the one or more first reference signals provide a first noise estimation for the first set of symbols and the one or more second reference signals provide a second noise estimation for the second set of symbols;
receive transmissions during the first set of symbols and the second set of symbols; and
compute a first plurality of log likelihood ratios (LLRs) for the first set of symbols based at least in part on the first noise estimation, and computing a second plurality of LLRs for the second set of symbols based at least in part on the second noise estimation.

29. The apparatus of claim 28, wherein the one or more second reference signals are added to the second set of symbols based at least in part on the one or more first reference signals being absent from the second set of symbols and a first expected noise level of the first set of symbols being different than a second expected noise level of the second set of symbols.

30. The apparatus of claim 28, wherein the one or more second reference signals are added to the second set of symbols based at least in part on a spacing between transmissions of the one or more first reference signals.

* * * * *